United States Patent [19]
Smith et al.

[11] Patent Number: 6,088,732
[45] Date of Patent: Jul. 11, 2000

[54] CONTROL OF DATA TRANSFER AND DISTRIBUTED DATA PROCESSING BASED ON RESOURCE CURRENTLY AVAILABLE AT REMOTE APPARATUS

[75] Inventors: Alan P Smith; Andrew P Grace, both of Ipswich, United Kingdom

[73] Assignee: British Telecommunications public limited company, London, United Kingdom

[21] Appl. No.: 09/077,521

[22] PCT Filed: Mar. 13, 1998

[86] PCT No.: PCT/GB98/00761

§ 371 Date: May 29, 1998

§ 102(e) Date: May 29, 1998

[87] PCT Pub. No.: WO98/42101

PCT Pub. Date: Sep. 24, 1998

[30] Foreign Application Priority Data

Apr. 14, 1997 [GB] United Kingdom .................. 9705371

[51] Int. Cl.[7] ........................ G06F 15/16; G06F 15/173
[52] U.S. Cl. ...................... 709/229; 709/227; 709/232; 709/226
[58] Field of Search ................................. 709/229, 227, 709/232, 226

[56] References Cited

U.S. PATENT DOCUMENTS

| 5,021,943 | 6/1991 | Grimes | 709/228 |
|---|---|---|---|
| 5,341,477 | 8/1994 | Pitkin et al. | 709/226 |
| 5,459,837 | 10/1995 | Caccavale | 709/226 |
| 5,539,813 | 7/1996 | Jonsson | 379/202 |
| 5,974,460 | 10/1999 | Maddalozzo, Jr. et al. | 709/224 |

FOREIGN PATENT DOCUMENTS

| WO 96/17460 | 6/1996 | WIPO . |
|---|---|---|
| WO98/42101 | 9/1998 | WIPO . |

*Primary Examiner*—Krisna Lim
*Attorney, Agent, or Firm*—Nixon & Vanderhye P.C.

[57] ABSTRACT

A method of providing a service over a plurality of terminals connected over a network comprises determining resources required for a service to be provided, determining resources currently available at each terminal, comparing the required resources with the available resources, and controlling the service provided at each terminal as a result of the comparison.

48 Claims, 19 Drawing Sheets

CONTROL OF DATA TRANSFER AND DISTRIBUTED DATA PROCESSING BASED ON RESOURCE CURRENTLY AVAILABLE AT REMOTE APPARATUS

The present invention relates to the control of transfer of data between remote locations and a method of controlling the distributed processing of data.

With the increasing use of networked information systems which provide distributed applications, there is a problem of lack of homogeneity of the local resources for implementation of the distributed application. For example, distributed applications can operate over networks such as the Internet, Wide Area Networks (WANs) and Local Area Networks. (LANs). The computers which are connected over such networks can have different capabilities and the capabilities of the local machines or terminals must be taken into consideration when setting up a distributed application which is to be implemented over the network. Also, the capabilities of the network to support the distributed application must also be taken into consideration.

Work has been undertaken with regard to establishing guaranteed quality of service in the network part of a distributed application e.g. the resource reservation protocol (RSVP) in the Internet and Q.2931 in an Asynchronous Transfer Mode (ATM). However, in a network of heterogenous terminals the capability of the terminals must be taken into account in order to guarantee that the distributed application will operate satisfactorily. In many of the existing distributed applications, a person wishing to set up a distributed application such as video conferencing must take into consideration the resources available at the terminals when setting up the application.

The problem of negotiating a quality of service for a multimedia application operative over a network of heterogenous terminals has been considered in an article entitled "On QoS Negotiation in Distributed Multimedia Applications" by A. Vogel et al, Department IRO, University of Montreal, 1993 [Voge 93d], Department Publication #891. In this paper a multimedia object is defined as comprising one of a plurality of media types e.g. audio, video, text, images, audio and video, and the media types comprise a set of parameters defining properties of the multimedia object. Capabilities of the operating system at the terminals are defined in terms of the media type supported and hardware parameters. Thus, in order to determine the quality of service for the multimedia application, negotiation takes place by comparing the media type parameters with the media type and hardware parameters. Quality of service can then be determined accordingly.

The problem with the approach taken by Vogel et al is that by using the media types as parameters to negotiate the quality of service, no account is taken in the negotiation of the workload of the terminals. For example, although a terminal may be capable of supporting a multimedia application utilising video of MPEG2 format, when no other applications are running on the terminal, as soon as other applications are run and consume resources at the terminal, the terminal is no longer able to support the service with video in MPEG2 format.

In accordance with a first aspect the present invention provides control apparatus for controlling the transfer of information to a remote apparatus, the control apparatus comprising:

determining means for determining resources required at the remote apparatus to process the information;

monitoring means for monitoring the resources currently available at the remote apparatus which is to receive the information;

comparing means for comparing the resources required and the resources currently available at the remote apparatus; and control means for controlling the transfer of information to the remote apparatus in accordance with the result of the comparison.

This aspect of the present invention also provides a method of controlling the transfer of information to a remote apparatus, the method comprising:

a determining step of determining resources required at the remote apparatus to process the information;

a monitoring step of monitoring the resources currently available at the remote apparatus which is to receive the information;

a comparing step of comparing the resources required and the resources currently available at the remote apparatus; and a control step of controlling the transfer of information to the remote apparatus in accordance with the result of the comparison step.

This aspect of the present invention thus enables the requirements of the information which are required in order for the information to be used at a remote apparatus to be compared with the resources currently available for processing the information at each remote apparatus. The transfer of information to the remote apparatuses can then be controlled accordingly to ensure that remote apparatuses only receive information which they are capable of processing. Since the available resources are monitored, the control process can be carried out adaptively to ensure that information is only transferred if it can be processed when received.

The control can take the form of simply preventing the transference of information which is not compatible with the resources available at the remote apparatus, or the remote apparatus can instigate the negotiation to down grade the information from one format to another which is compatible with the resources available at the remote location.

The information to be transferred can comprise several types of information e.g. video, audio and text, or a combination of those. Each information type will have a requirement which must be met by the resources available at each terminal in order for the information to be transferred. Further, each information type can be one of many formats e.g. for video, MPEG or MPEG2. Thus resources must be available which are capable of using not only the information type, but also the format. More than one format of the information may be available and thus negotiations can take place between an information source and the terminal in order to select information in the appropriate format which is compatible with the resources available at the terminal.

In an embodiment of the present invention, a user operating a terminal is also able to enter user preferred parameters which comprise a requirement which must be met before the information is transferred. For example, a user may specify that text is only to be received at the terminal in a specific word processing format. Thus, if the information requested does not include text in this format, the requirement is not met and thus data will not be transferred. Alternatively, the information may contain text in many formats and the specified format will be selected for transference.

In a further specific embodiment of the present invention the communication links between the remote apparatuses may also have parameters associated therewith which will define resources available for data transfer. These resources of the network will be compared together with the resources available at the remote apparatus in order to determine whether the combined resources are capable of allowing the transference and use of information at the remote apparatus. For example, the communication links between the remote apparatuses may not support the transference of video (because for instance, the communication link is not fast enough) and thus although the remote apparatus may be capable of playing video, the communication links are not capable of transferring it.

The remote apparatuses may be connected together using a simplex or duplex communication mode. In a duplex communication mode a remote terminal which is a destination for information from another remote apparatus may also be a source of information. Such a duplex communication arrangement exists in, for example, a video conferencing application, whilst a simplex communication arrangement exists in a video on demand application.

Another aspect of the present invention provides control apparatus for controlling the distributed processing of data by a plurality of remote apparatuses, the control apparatus comprising:

determining means for determining resources required at the or each remote apparatus to process the data in a distributed manner;
 monitoring means for monitoring resources currently available at the or each remote apparatus;
 comparing means for comparing the resources required and the resources currently available at the or each remote apparatus; and
 control means for controlling the processing of data by the or each remote apparatus in accordance with the result of the comparison.

This aspect of the present invention also provides a method of controlling the distributed processing of data by a plurality of remote apparatuses, the method comprising:

a determining step of determining resources required at the or each remote apparatus to process the data in a distributed manner;
 a monitoring step of monitoring resources currently available at the or each remote apparatus;
 a comparing step of comparing the resources required and the resources currently available at the or each remote apparatus; and
 a control step of controlling the processing of data by the or each remote apparatus in accordance with the result of the comparison step.

In such a distributed processing arrangement data can comprise a plurality of data types and the processing of the data types can be controlled such that each remote apparatus only receives and processes data of the type which it is capable of processing as indicated by the comparison of the data requirements and the resources currently available at each remote apparatus.

A further aspect of the present invention provides a method of providing a service over a plurality of terminals connected over a network, the method comprising:

a determining step of determining resources required at each terminal to provide the service;
 a monitoring step of monitoring resources currently available at each terminal;
 a comparison step of comparing the resources required and the resources currently available at each terminal; and
 a control step of controlling the service provided at each terminal in response to the result of the comparison step.

This aspect of the present invention also provides apparatus for providing a service over a plurality of terminals connected over a network, said apparatus comprising determining means for determining resources required at each terminal to provide the service;
 monitoring means for monitoring resources currently available at each terminal;
 comparison means for comparing the resources required and the resources currently available at each terminal; and
 control means for controlling the service provided at each terminal in response to the result of the comparison.

In this aspect of the present invention the attributes of the service to be provided can be the requirements for the processing and/or transference of data between each terminal.

The service can require the use of a plurality of data types by the terminals and the requirements of the service can comprise a set of requirements for each data type. Each set of requirements are compared with the resources of each terminal in order to determine how to set up the service at each terminal.

Each data type may have more than one data format and each set of requirements can include requirements of each data format. For instance, the data type can comprise video and the format can comprise the video format. The service provided can thus be set up so that if some or all of the users are capable of receiving video then video data is sent to those terminals capable of receiving it. Also, the transmitted format of the video may be set so as to be dependent on the capabilities of the terminal which is to receive it.

In one embodiment a user can enter preferred requirements for each terminal and these can then comprise requirements which must be met in order for the service to be provided at the terminal.

In a further specific embodiment of the present invention, the network can also have resources associated therewith which are read and compared with the requirements of the service. The resources of the network comprise resources which must be compatible with the requirements of the service.

In an embodiment of the present invention each terminal is configured in response to the comparison of the requirements of the service and at least the resources of the respective terminal. For instance, when the service is a video conferencing application, if a terminal is not capable of using audio data for example in a PC it does not have a sound card, the part of the application running on the terminal is configured accordingly. Also, audio data need not be sent over the network to the terminal. Also, each of the terminals can be configured to ignore a data type if none of the terminals are capable of generating such a data type. E.g. in the video conferencing example, if none of the terminals have a camera and therefore no video data can be generated, the applications running on each of the terminals can be configured so as not to display a video window since there is no video data.

Embodiments of the present invention will now be described with reference to the accompanying drawings, in which:

DETAILED DESCRIPTION OF THE ILLUSTRATED EMBODIMENTS

Figure 1A:
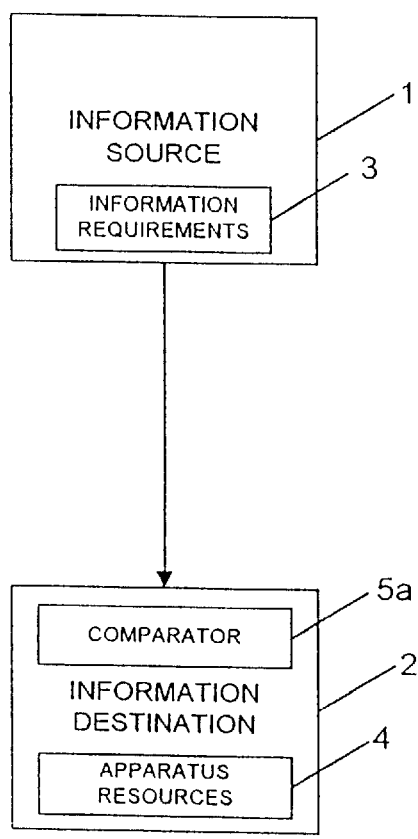
FIGS. 1a and 1b are schematic diagrams of alternative general configurations in accordance with one aspect of the present invention.

A general aspect of the present invention will now be described with reference to FIGS. 1a and 1b.

An aspect of the present invention relates to the transference of information from an information source 1 to an information destination 2. Such a transference can take place over a Wide Area Network (WAN) such as the Internet or an Intranet, over a Local Area Network (LAN) or over any other form of communication link such as a direct communication. In FIG. 1a the information destination 2 requests information from the information source 1. The information requested from the information source has information requirements 3 associated therewith and these information requirements 3 are passed to the information destination 2 for comparison with the resources of the apparatus 4 which are determined by monitoring the resources available at the apparatus. The comparison of the information requirements 3 and the apparatus resources 4 is carried out by the comparator 5a in the information destination. If the result of the comparison by the comparator 5a determines that the apparatus resources 4 are compatible with information requirements 3, then the information source 1 passes the information to the information destination 2. In this way, passage of information over the communication link is controlled in order to avoid the wasteful passage of information which cannot be used at the information destination 2.

Figure 1B:
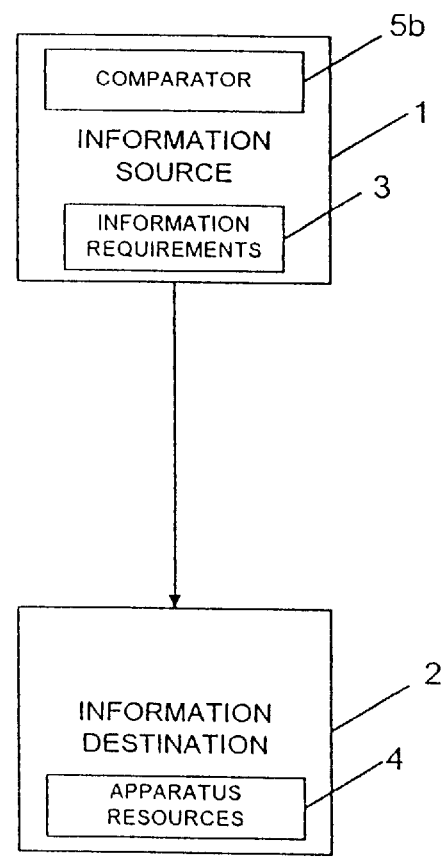

FIG. 1b illustrates an alternative arrangement wherein the comparator 5b resides at the information source 1. In this arrangement the information destination 2 requests information from the information source 1 and pass the apparatus resources 4 to the information source 1. The comparator 5b compares the apparatus resources 4 with the relevant information requirements 3 to determine whether they are compatible. If they are compatible the requested information is passed from the information source 1 to the information destination 2.

The information requirements 3 comprise a number of requirements which the information destination must meet in order for the information to be able to be used. For example, if the information comprises video data, the video data at the information source may be in one of a number of formats e.g. MPEG. In order for this to be usable at the information destination, the requirements which are associated with it indicate the requirements for the video to play e.g. a certain type of processor, the minimum memory requirement, a certain type of display, and a certain type of application capable of playing video in MPEG format. If the resources at the information destination 2 indicated by the apparatus resources 4 meet or exceed the requirements indicated by the information requirements 3, then the data can be transferred from the information source 1 and used at the information destination 2.

Figure 2:
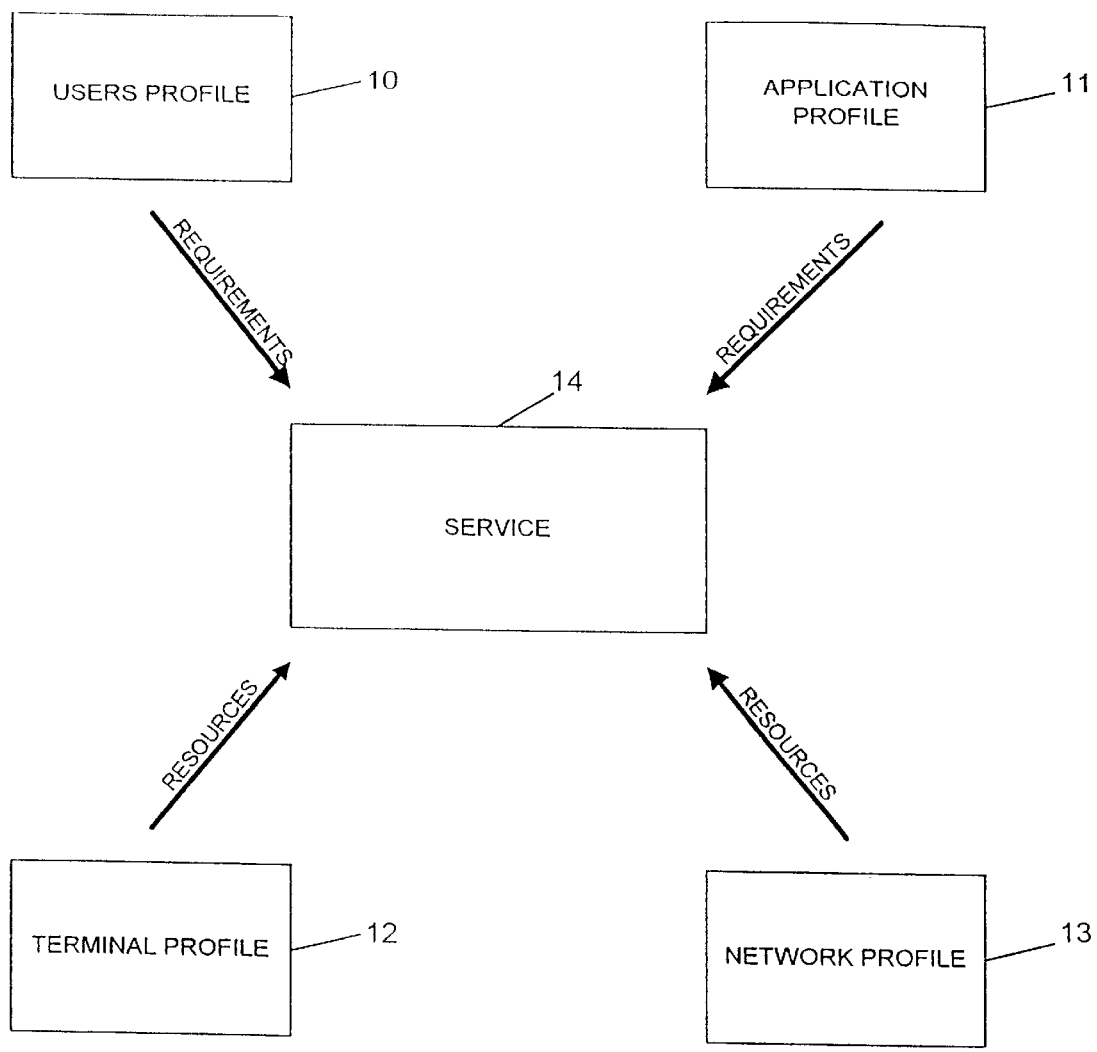
FIG. 2 is a schematic illustration of the principles of providing a service over a network of terminals.

FIG. 2 illustrates another aspect of the present invention which is the control of the provision of a service 14. In order for the service to be provided at a terminal, there are four profiles which must be compatible in order for the service to be provided. These are a user's profile 10, an application profile 11, a terminal profile 12 and a network profile 13. The application profile 11 defines the requirements which must be met for the service to operate at a terminal and this is generally determined by the type of data which is to be processed in a distributed manner e.g. by the transference of the data between terminals during the provision of the service 14. The terminal profile 12 defines the resources which are available at the terminal for use during the provision of the service 14. This can, for instance, define the hardware and software available at the terminal and the current dynamic configuration of the terminal. The network profile 13 also defines resources which are available for the service 14. The network profile 13 can, for example, define the data format for transference of the data over the network, and the maximum possible data transfer rate. If these resources do not meet the requirements of the application profile 11 then the service cannot be provided over the network or at least over certain communication links in the network. The user's profile 10 comprises a set of requirements which are entered by a user in order to define the requirements that the user wishes during the provision of the service. For example, the user may define a minimum video format or even a preset time of day so that the service can only be provided at that time of day. Thus the service 14 can only be provided when the requirements of the user's profile 10 and the application profile 11 are met by the terminal profile 12 and the network profile 13. The level of the service provided at the terminal can be varied dependent upon the level at which the resources meet with the requirements. Terminals throughout the network can thus have different levels of service dependent upon how the specific terminal resources and the specific network resources match the specific user's profile and the application requirements.

Figure 3:
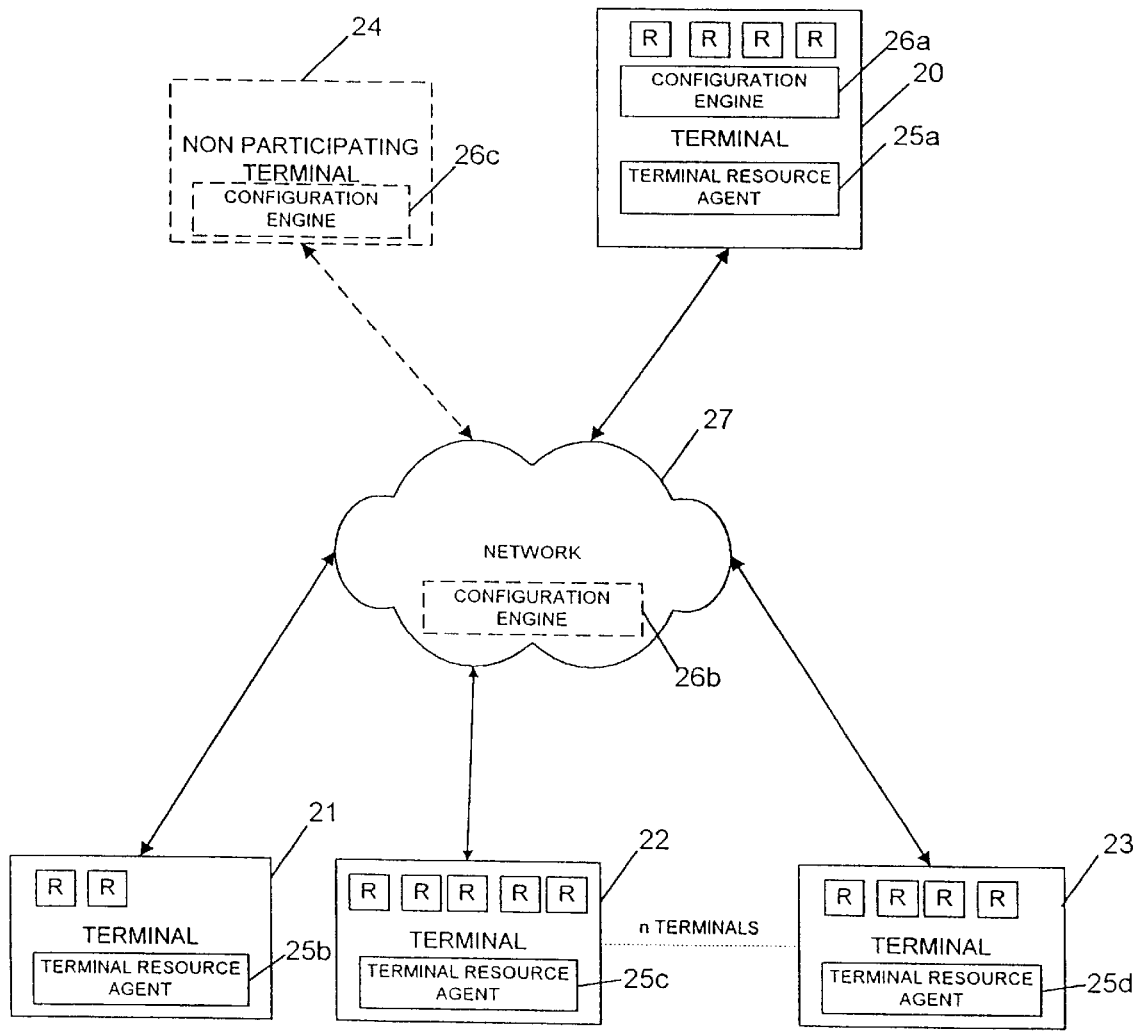
FIG. 3 is a schematic diagram of a network over which data is passed between terminals in a distributed processing arrangement.

FIG. 3 schematically illustrates a network over which a distributed application operates to provide a service. A plurality of terminals 20, 21, 22 and 23 are connected via a network 27. Each terminal has resources R available which comprise hardware and software resources and also dynamic resources currently available e.g. currently available memory. Terminals 20, 21, 22 and 23 can comprise personal computers connected over a Wide Area Network such as the Internet or Intranet or over a Local Area Network (LAN). At each terminal 20, 21, 22 and 23 there is a terminal resource agent 25a, 25b, 25c and 25d which comprises an application active in the terminal to interface with a configuration engine 26a, 26b, or 26c which can be provided at any point in the network e.g. in a terminal 20, in the network 27 or in a non-participating terminal 24. The terminal resource agents 25a, 25b, 25c and 25d interface with the configuration engine 26a, 26b or 26c in order to control the transference of data and the provision of the service. Thus, the control of the distributed application is achieved by a distributed application. When a service is to operate over the network, each of the terminal resource agents determines a terminal profile which contains details of the resources offered by the terminal. The configuration engine 26a determines an application profile which contains details of the resources required by an application for it to run on a terminal. The provision of a service may require more than one application e.g. more than one media type (data type) in a multimedia environment and the configuration engine holds the application profile as a database for each application that is required for the service.

Although in this embodiment the configuration engine is located centrally, it could be distributed over the terminals.

Figure 4A:
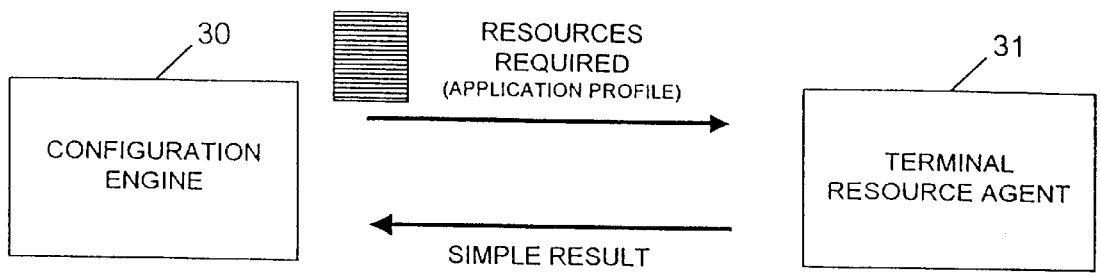
FIGS. 4a and 4b illustrate alternative methods of determining whether the terminal resources match the system requirements.
Figure 4B:
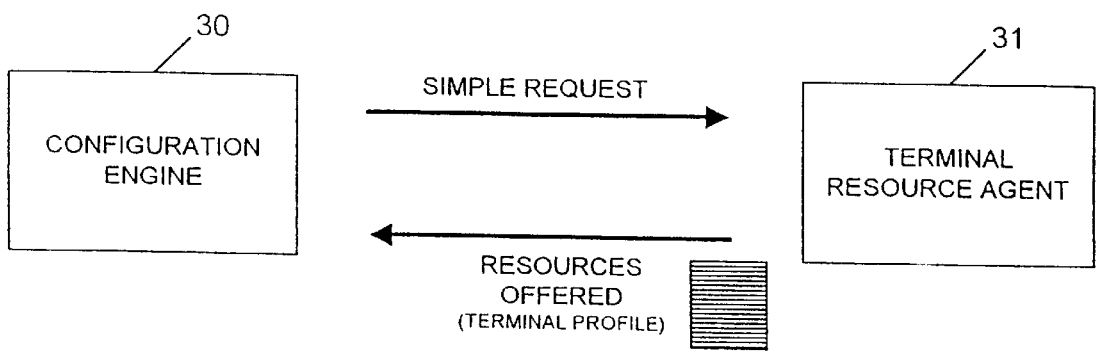

FIGS. 4a and 4b illustrates alternative methods of operation. In FIG. 4a the configuration engine sends the application profile to the terminal resource agent 31 and the terminal resource agent 31 carries out a comparison of the application profile and the terminal profile and returns the simple result of the comparison to the configuration engine 30.

FIG. 4b illustrates an alternative operation wherein the configuration engine 30 sends a simple request to the terminal resource agent 31 which returns the terminal profile to indicate the resources available at the terminal. The configuration engine 30 can then carry out a comparison of the terminal profile and the application profile to determine how to configure the system for the provision of the service.

The comparison of the information profile and the terminal profile can be carried out at the terminal resource agent or the configuration engine. This comparison can be performed in a number of different ways e.g. using state driven tables, fuzzy logic, neural networks, or artificial intelligence.

Figure 5:
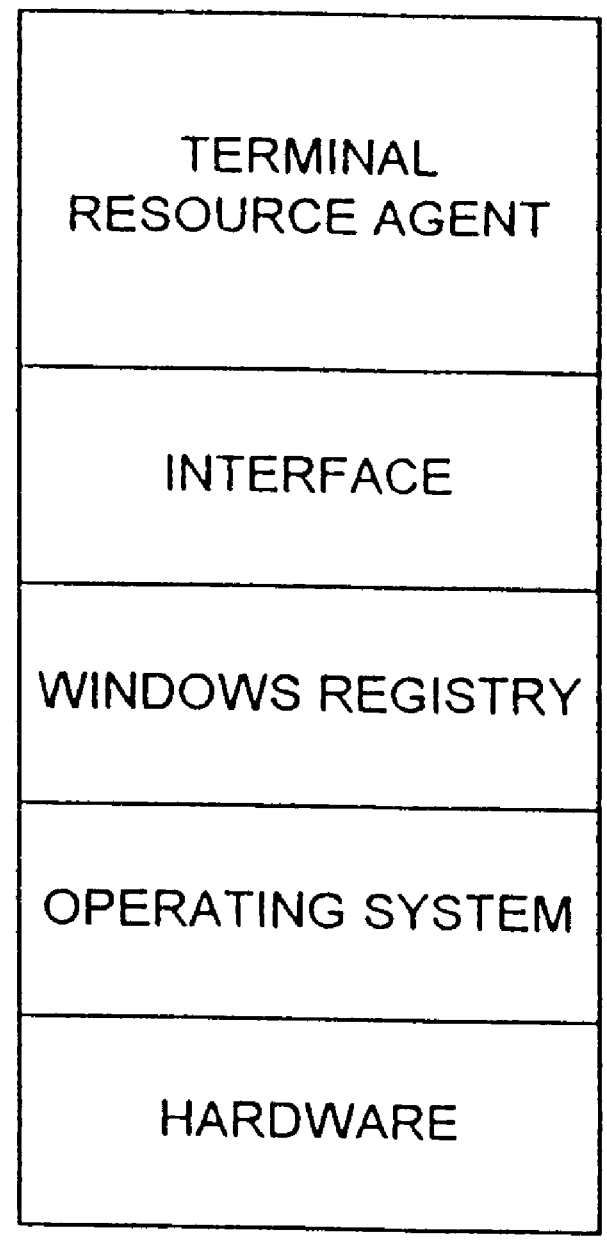
FIG. 5 is a schematic illustration of a specific configuration of the terminal resource agent in a PC operating Microsoft Windows (trade mark)

In this embodiment wherein the terminals comprise personal computers, these can operate the Microsoft Windows (trade mark) operating system and in this environment FIG. 5 illustrates the specific configuration of the terminal resource agent. The terminal resource agent is coupled to the Windows Registry via an interface. The Windows Registry contains all information necessary to form the terminal profile and since this is dynamically updated the terminal profile defines the dynamic state of the terminal. The Windows Registry is provided in an operating system which is in turn provided on the hardware.

If the terminal profile meets or exceeds the requirements of the application i.e. for a data or media type, the terminal resource agent nationally reserves the resources so that they are not seen to be available to another application (data or media type) required for the service. A particular example of this would be the available processing power on a terminal. In a video and audio conferencing service for example a particular terminal may be capable of running one but not both of the applications to make up the service. It may thus be decided that the terminal is to run the audio application only, thus allowing the user to take same role in the conference and the audio application is given priority over the video application.

Figure 6A:
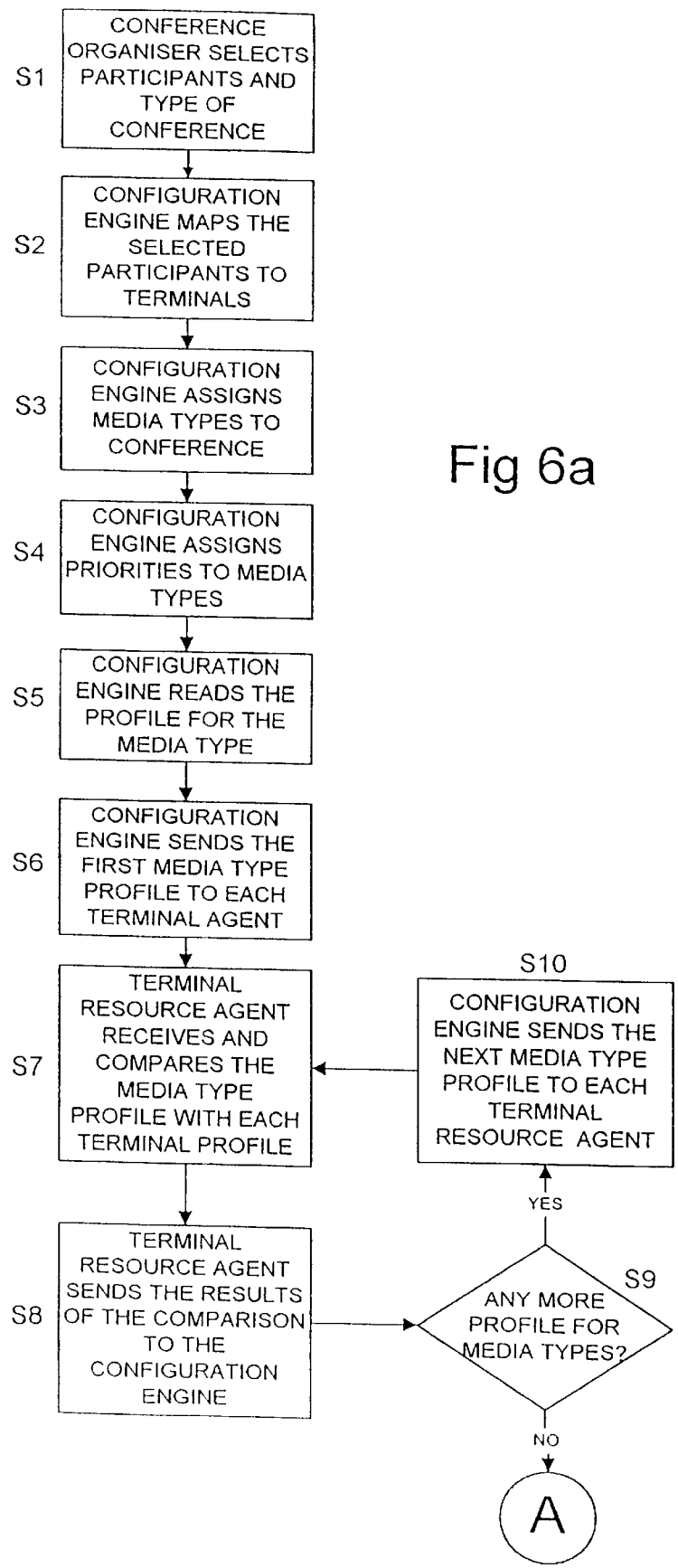
FIGS. 6a and 6b comprise a flow diagram illustrating the operation Qf a video conferencing system in accordance with an embodiment of the present invention.
Figure 6B:
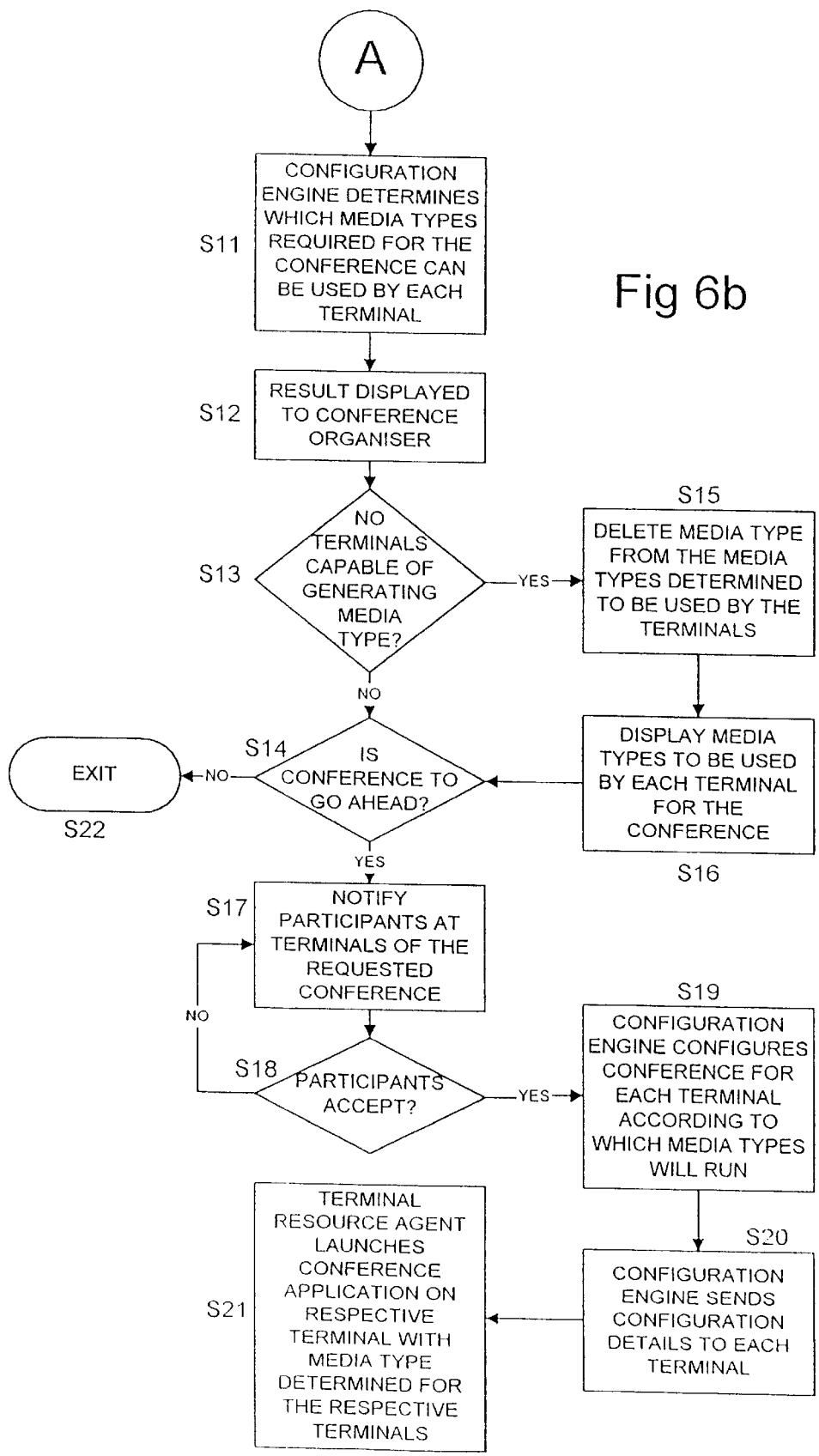

A specific embodiment will now be described with reference to FIGS. 6a and 6b which are a flow diagram of the operation of a video and audio conference service.

In step S1 a conference organiser using a terminal selects the participants required for a video and audio conference and also the type of conference required i.e. the type of service. In step S2 the configuration engine maps the selected participants to the terminals. In step S3 the configuration engine then assigns media types to the conference dependent on the type of conference which is selected. For example, a video and audio conference may be required which also enables text to be passed between the terminals. Thus the media types required are video, audio and text media types. In other words the data which is to be passed between the terminals comprises video, audio and text data and the passage of this data over the network will be controlled in dependence upon the ability of the terminals to use the data.

In step S4 the configuration engine assigns priorities to the media types. For example, if a video and audio conference service is to be provided, the audio media type may be given priority to ensure that in case there are insufficient resources available at a terminal both the audio and video media type to run, at least the audio application can be run since this will be given priority.

In step S5 the configuration engine reads the profiles for the media types and in step S6 the media type profile having the highest priority is sent to each terminal resource agent. In step S7 the terminal resource agent receives and compares the media type profile with the terminal profile and in step S8 the results of the comparison are sent to the configuration engine. In step S9 it is determined whether there are any more profiles for media types and if so in step S10 the configuration engine sends the next media type profile to each terminal resource agent and the process returns to step S7. When in step S9 it is determined that all media type profiles have been compared with the terminal profiles, the configuration engine determines which media types required for the conference can be used by each terminal in step S11. The result is then displayed to the conference organiser in step S12 and in step S13 it is determined whether there is a media type which cannot be generated by any of the terminals. If in step S13 it is determined that there is a media type which cannot be generated by any of the terminals, this is deleted from the media types determined to be used by the terminals in step S15. In step S16 the media types to be used by each terminal for the conference are then displayed and in step S14 the conference organiser is given the option to go ahead with the conference. If a conference is not to go ahead the process stops at step S22. If the conference is to go ahead in step S17 the participants at the terminals are notified of the requested conference and in step S18 the participants can accept and join the conference. If the participants accept and join the conference, in step S19 the configuration engine configures the conference for each terminal according to which media types will run on the respective terminal. In step S20 the configuration engine sends configuration details to each terminal and in step S21 each respective terminal resource agent launches the conference media type on the respective terminal with the media types determined for the respective terminals.

In step S13, the step of determining whether there is a media type which cannot be generated by any of the terminals avoids the useless reservation of resources at terminals. For video conferencing, not all terminals will necessarily be equipped with cameras. However, as long as the terminal has a screen, the user will be able to receive images from those users that do have a camera. However, if none of the terminals have a camera the video media type will not be generated and thus the level of the video conferencing service provided at the terminals can be reduced accordingly. The principle of ensuring that the level of service provided depends on whether or not a media type can be generated is dependent upon a requirement for an application to be met by a resource of at least one of the terminals. This can be termed a 'group resource'.

Table 1 below illustrates an example of a media type resource requirement which is a table of resources which are required for a media type e.g. video or audio.

TABLE 1

| Media Type Resource Requirement | Notes |
| --- | --- |
| Application Name | The application must be present on the terminal for it to run. However in future services this not be a block since the application could be downloaded using a language such as Java. |
| Processor types | A list of processor types (e.g. Pentium, 486, etc) that the application will run on. Also the percentage of that processor required to run the application. |
| Operating Systems | A list of Operating Systems that the application will run on (e.g. Windows 95, Solaris 2.5, etc). |
| Memory | The RAM installed |
| Camera required | Whether a camera is required to run the application or whether a camera is required by at least one terminal participating in a service, i.e. a group resource. |
| Camera type | A list of camera types that can be used with the application. The value can be any. |
| Sound card required | Whether a sound card is required to run the application or whether a sound card is required by at least one terminal participating in a service i.e. a group resource. |
| Sound card type | A list of sound card types that can be used with the application. The value can be any. |
| Screen | Whether a screen is required to run the application or whether a screen is required by at least one terminal participating in a service, i.e. a group resource. |
| Microphone | Whether a microphone is required to the application or whether a microphone is required by at least one terminal participating in a service, i.e. a group resource. |
| Speaker | Whether a speaker is required to the application or whether a speaker is required by at least one terminal participating in a service, i.e. a group resource. |
| Network connection bandwidth | |
| Minimum number of users | Not passed to Terminal Resource Agent - used by Confguration Engine |

For each resource for a media type, the format required can be one or many e.g. the camera type can be a specific type, a group of types or any type of camera.

Each type of data or media type will have a profile associated with it which defines the requirements for the data to be processed at a terminal. Thus for the provision of a service many profiles may be required.

Table 2 below illustrates an example of a terminal profile.

TABLE 2

| Terminal Resource | Notes |
| --- | --- |
| Applications | A list of applications present on the terminal. |
| Processor type Operating System Memory | |
| Camera present | Whether a camera is present. This can be no, available or in use. |
| Camera type | The type of camera available to the terminal. |
| Sound card | Whether a sound card is present. This can be no, available or in use. |
| Sound card type | The type of sound card available to the terminal. |
| Screen | Whether a screen is present. This can be no, available or in use. |
| Microphone | Whether a microphone is present. This can be no, available or in use. |
| Speaker | Whether a speaker is present. This can be no, available or in use. |
| Network connection bandwidth | |

The terminal profile is essentially the same as the information or media type profile except that it specifies the resources actually available and is thus limited to only a single operating system, processor type, camera, sound card etc. Although a list of applications forms part of the profile, it is not essential for an application to be present at a terminal since the application could be automatically downloaded to the terminal.

This embodiment utilises a multicast broadcast to transmit the video conference between the participants. This can take place for example over an Intranet or the Internet using Large Scale Multicast Application (LSMA). Although the internet was conceived as unicast, with the advent of multimedia applications and a desire to provide distributive processing over the internet, the Multicast Backbone (MBONE) which comprises a virtual network layered on top of the physical internet to support the routing via IP multicast packets has been devised. Multicasting over networks allows a single copy of the same data to be sent and shared between multiple receivers thus reducing bandwidth.

Figure 7:
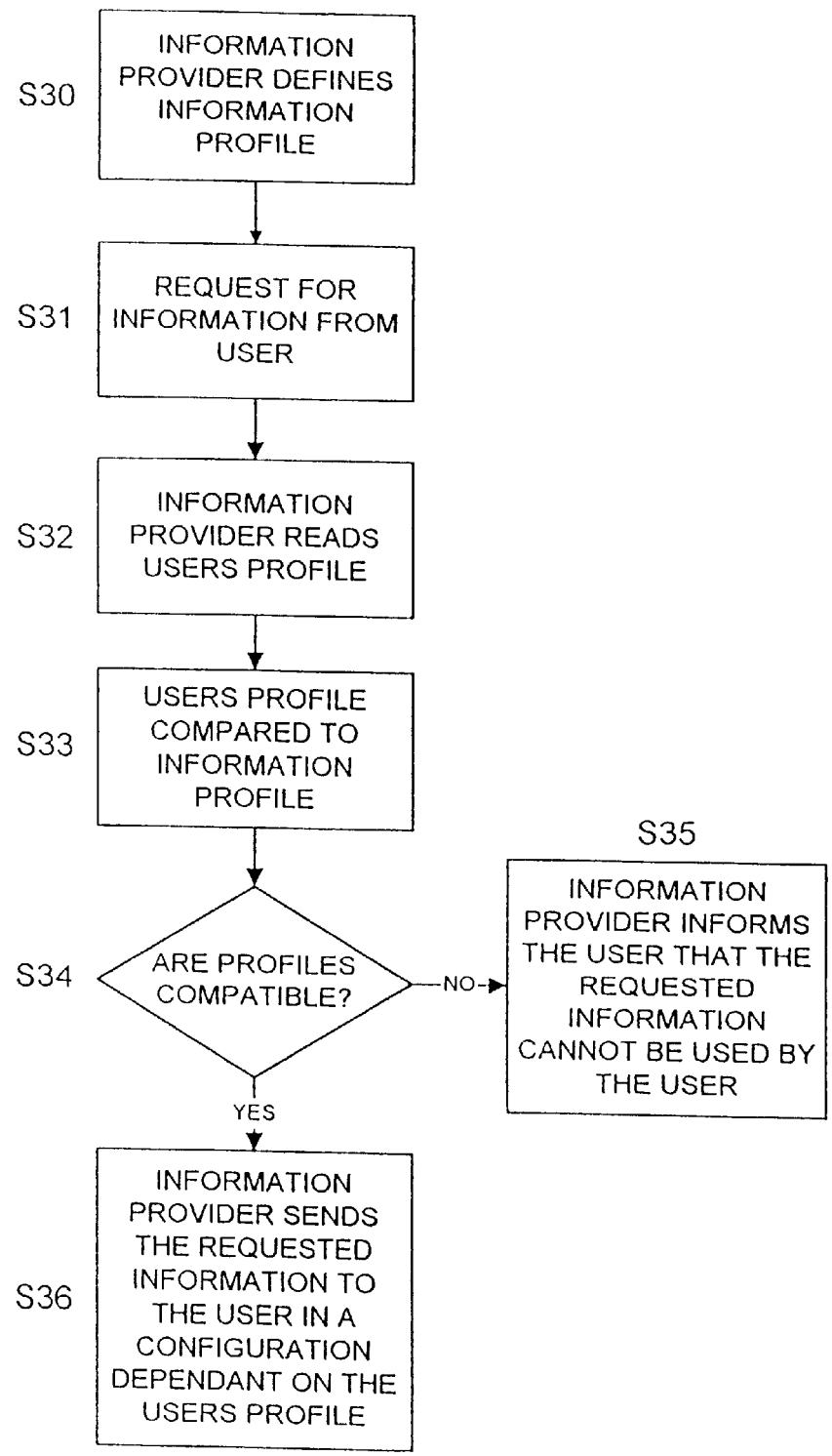
FIG. 7 is a flow diagram illustrating the operation of a video on demand system in accordance with an embodiment of the present invention.

A second embodiment will now be described with reference to FIG. 7 which is a flow diagram of the operation of a video on demand service.

In step S30 an information provider defines an information profile for information (video data) to be transferred to a user. In step S31 a user requests information from the information provider and in step S32 the information provider reads the user's profile. In step S33 the user profile is compared to the information profile and in step S34 it is determined whether the profiles are compatible. If the profiles are not compatible, in step S35 the information provider informs the user that the requested information cannot be used by the user. If the profiles are compatible in step S36 the information provider sends the requested information to the user in a configuration dependent on the user's profile.

Thus, this embodiment is in principle similar to the video conferencing embodiment except that only a single user's terminal is needed to be checked to determine whether it is capable of running the application i.e. running the requested video. In such an embodiment the communication link is unicast and need not be a network but can instead be a direct communication. Further, the computer used to provide the information i.e. serve the video can also be tested in a similar way as the terminal to ensure that it has the capacity to offer the service e.g. is the percentage of available processing power sufficient to provide the requested video to the terminal.

Another embodiment of the present invention for use in large scale multicast applications (LSMA) will now be described.

Multicast sessions over the internet can be set up by appropriately configuring a multicast session organiser which then causes an announcement of the multicast session to be broadcast. Anyone wishing to join the multicast session can see the announcements and request to join the session.

The problem with announced multicast applications are that since the configuration of the terminals of the participants is not known in advance, there is a problem of compatibility of the terminals of the participants and the multicast application. The present invention is particularly suited to the solution of this problem since the resources required for a multicast session can be determined and can comprise a part of the session parameters. These can then be compared with the resources currently available on a terminal for a participant requesting to join the multicast session.

Figure 8:
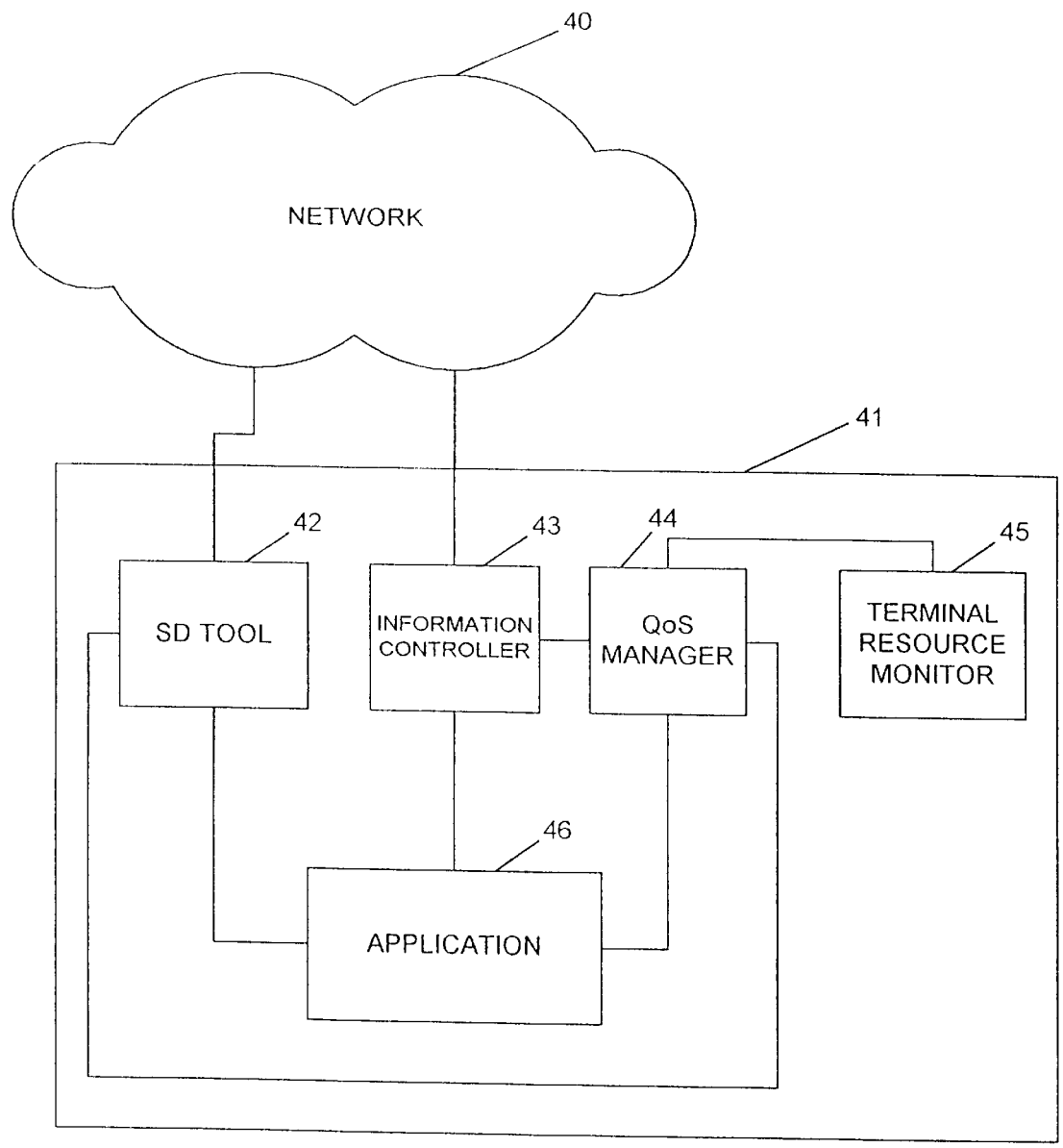
FIG. 8 is a schematic drawing of an embodiment of the present invention for multicast applications.

As can be seen in FIG. 8 a multicast session is available over the network 40. Operation in this embodiment is initiated by a user who selects a session to join using the session directory (SD) tool 42. In other embodiments applications may have built-in knowledge of session information or know where to go to retrieve it. The SD tool 42 is provided within a terminal 41 together with an information controller 43 to control the flow of information between the network 40 and the application 46. The information controller 43 is under the control of a Quality of Service (QoS) manager 44. A terminal resource monitor 45 is provided to either continuously or periodically monitor the resources available at the terminal 41 for use by an application 46 to process the received information. The QoS manager 44 receives the information on the resources available from the terminal resource monitor 45 as a terminal profile and also receives the information on the resources required by the information from the SD tool 42 as an application profile. By comparing the profiles the QoS manager 44 is able to control information controller 43.

Figure 9:
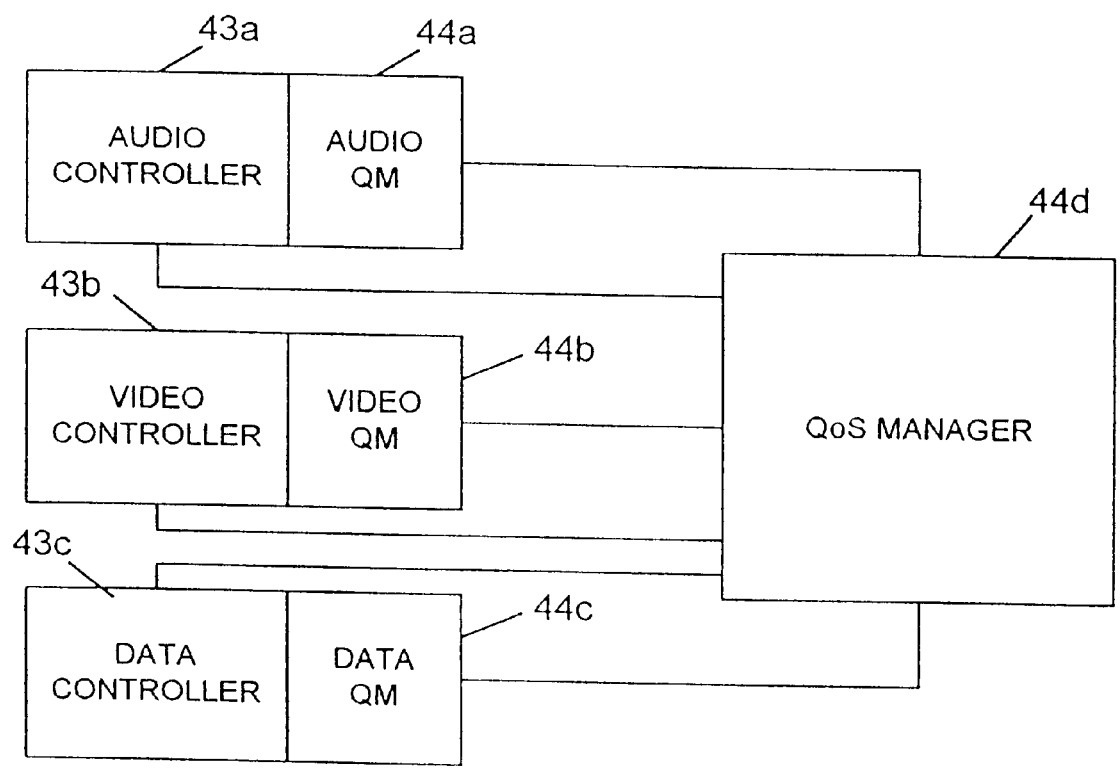
FIG. 9 is a more detailed diagram of the information controller and QoS manager of FIG. 8.

FIG. 9 illustrates in more detail the information controller 43 and the QoS manager 44. The information controller 43 comprises an audio controller 43a, a video controller 43b and a data controller 43c for controlling each of the different types of information: audio, video and data (e.g. text). Each of the controllers 43a, 43b and 43c have respective quality monitors (QM) 44a, 44b and 44c associated therewith in order to monitor the quality of the passage of the respective type of information e.g. to detect errors. The monitored quality of the information is then passed to the QoS manager 44d to provide for the adaptive control of the service i.e. adaptive control of the passage of information to the application 46 in dependence upon the monitored quality. The QoS manager 44d also directly controls each of the controllers 43a, 43b and 43c to selectively control the flow of information between the application 46 and the network 40.

The initiation of a multicast session will now be described with reference to FIGS. 10a and 10b. In step S40 a session organiser defines session parameters and these can comprise (1) media types e.g. audio, video, data, or a combination of these;
(2) formats i.e. the level of encoding e.g. DVD, MPEG, or MPEG2;
(3) time(s) of session(s);
(4) session name and description;
(5) type of session e.g. a broadcast which is unidirectional or a meeting which is two-way;
(6) the application required to be implemented to join the session.

The software required for implementing this is currently available over the internet for example from University College London, although this is modified so that the application profiles or information on where they may be obtained is conveyed.

In step S41 at a node in the network e.g. at a server, an application profile or profiles are determined using a database of application profiles for session parameters. A session announcement is then generated in step S42 wherein the announcement is made on one multicast address. The session announcement includes the session parameters and the application profiles for the session. If the session is available at various levels using different media types and different formats then a number of application profiles will be determined, one for each session level. For example, for a particular multimedia session it may be possible to join the session using the media type video only and it may also be possible to join the session with one of three different video formats e.g. DVD, MPEG or MPEG2. This information will be included in the session announcement together with the multicast addresses at which the media types are available.

In step S43 the SD tool 42 receives the session announcements and these are displayed to a user. In step S44 the process awaits the selection of a session by a user and if a user selects to join a session in step S45 the application which is identified in the session parameters for the selected session is launched. The QoS manager is then informed of the application profile or profiles in step S46 and in step S47 the QoS manager compares the application profile and current terminal profile for each level of service. The current terminal profile is detected in step S48.

It is then determined in step S49 whether the terminal profile matches or exceeds the application profile, and if so the QoS manager creates individual QoS objects for the information and loads the information handling code at the appropriate level in step S50. The information handling code comprises the media type controllers 43a, 43b and 43c. In step S51 the information handling code then passes the information to the application and thus in step S52 the session is invoked.

If in step S49 it is determined that the terminal profile does not match or exceed the application profile, in step S53 the application profile for each level of service is compared with the best terminal profile i.e. the resources which could be available if no other application is running at the terminal. The best terminal profile is detected in step S54. In step S55 it is then determined whether the best terminal profile matches or exceeds the application profile, and if so the user is informed that the session at the required level cannot currently be joined because the terminal resources currently available are insufficient. In step S59 the user is then given the option to close down other applications to free terminal resources. If in step S59a the user declines, in step S57 the application is then closed and the process terminates. If the user takes up the option and in step S59b closes down other applications and requests a retry to join the session the process returns to step S49.

If in step S55 it is determined that the best terminal profile does not match or exceed the application profile, in step S58 the user is informed that the session cannot be joined because the terminal cannot support the level of service required and the application is terminated in step S57.

Thus, if it is determined that there are sufficient resources currently available for the level of service that is currently requested by the user, appropriate codecs for media streams can be loaded to allow the media streams to pass between the application 46 and the network 40.

If on the other hand it is determined that the resources available on the terminal could never support the level of service required, the user is informed accordingly. However, if the resources currently available are insufficient but the total resources available on the terminal could support the service, the user is informed allowing them to close down other applications and thus free resources to allow the multicast session to be joined.

Figure 11A:
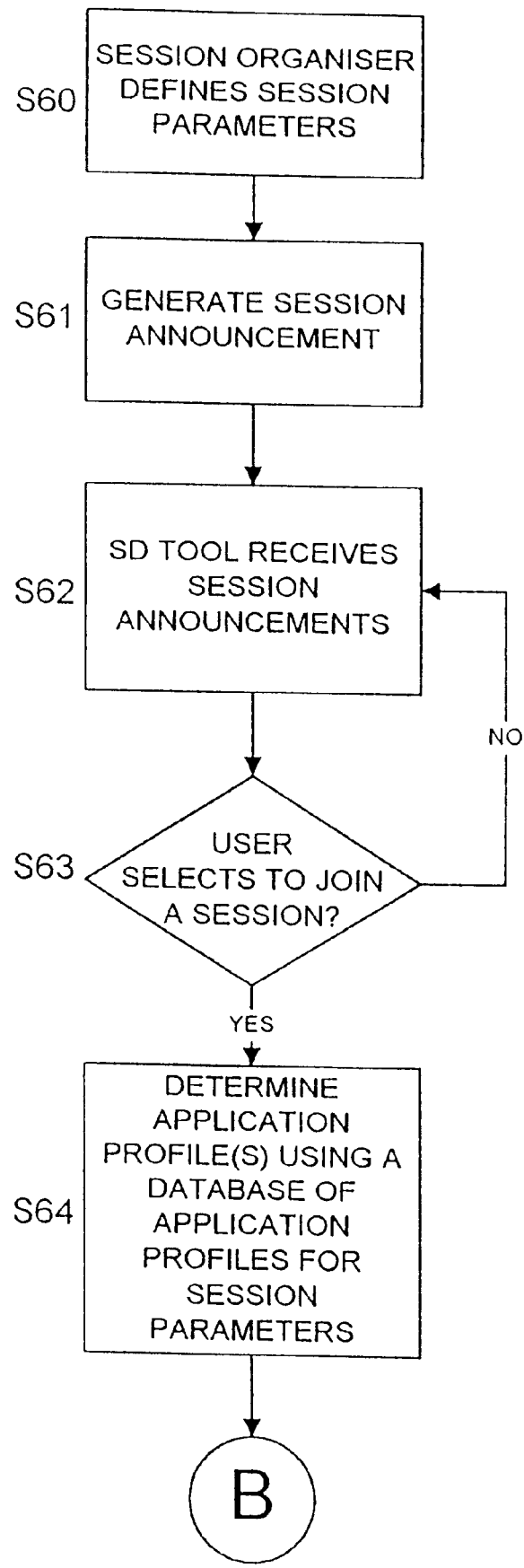
FIGS. 11a and 11b are flow diagrams of an alternative operation of the embodiment of FIG. 8.
Figure 11B:
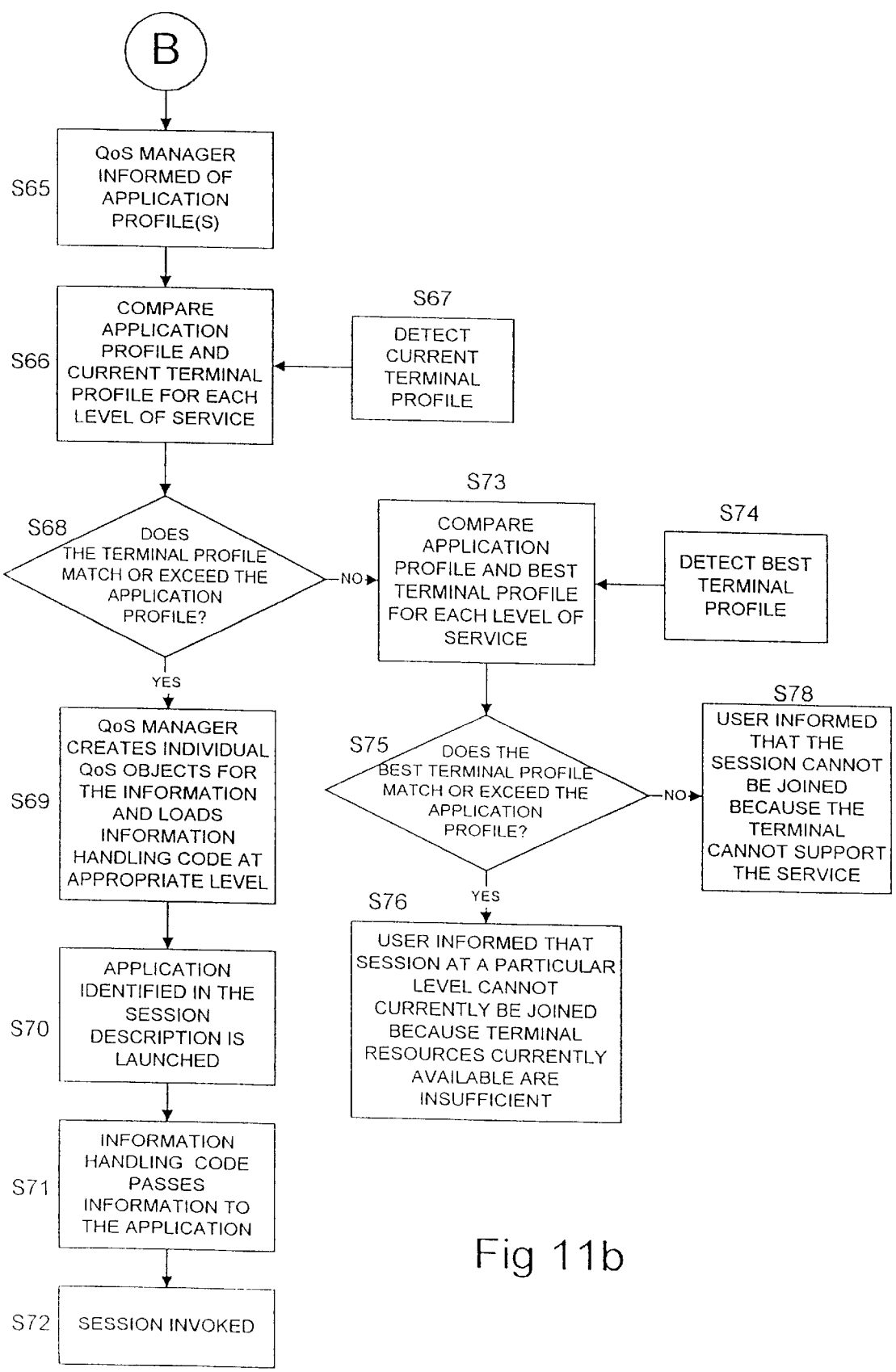

FIGS. 11a and 11b illustrate an alternative initiation method wherein in step S60 a session organiser defines session parameters as given hereinabove. In step S61 a session announcement is then made which includes all of the session parameters together with multicast addresses from which the media types are available for the session. In step S63 the process then awaits the selection of a session by a user. Once a user has selected a session in step S64 the application profile or profiles for the multicast session are determined using a database of the application profiles for the session parameters which is stored in the terminal. Such a database can be provided when the appropriate software is initially installed and can be updated automatically over the internet.

Figure 10A:
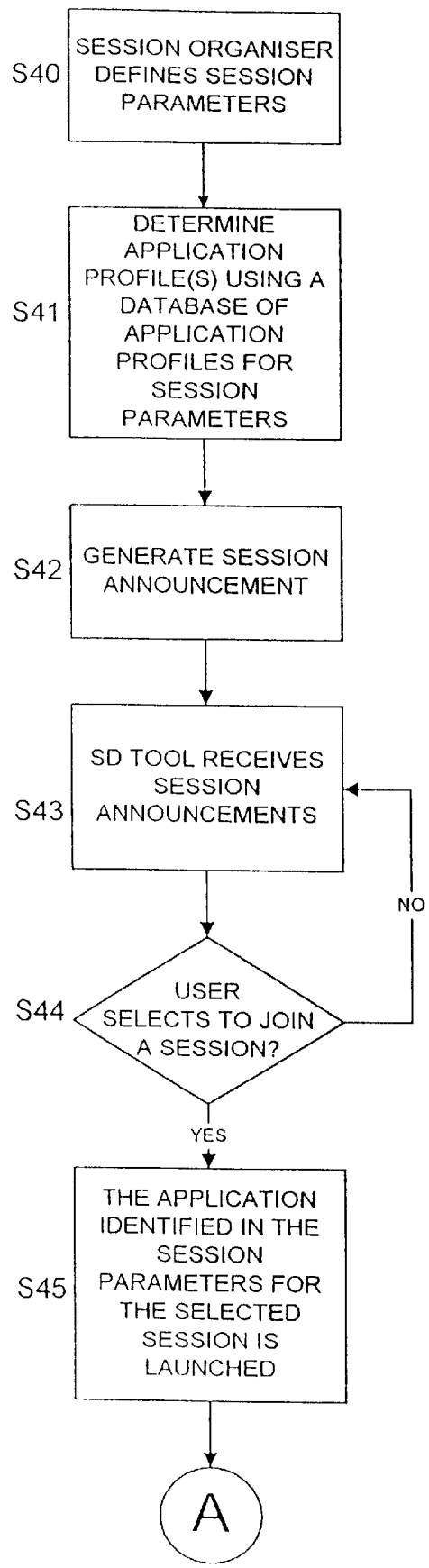
FIGS. 10a and 10b are flow diagrams of the operation of the embodiment of FIG. 8.
Figure 10B:
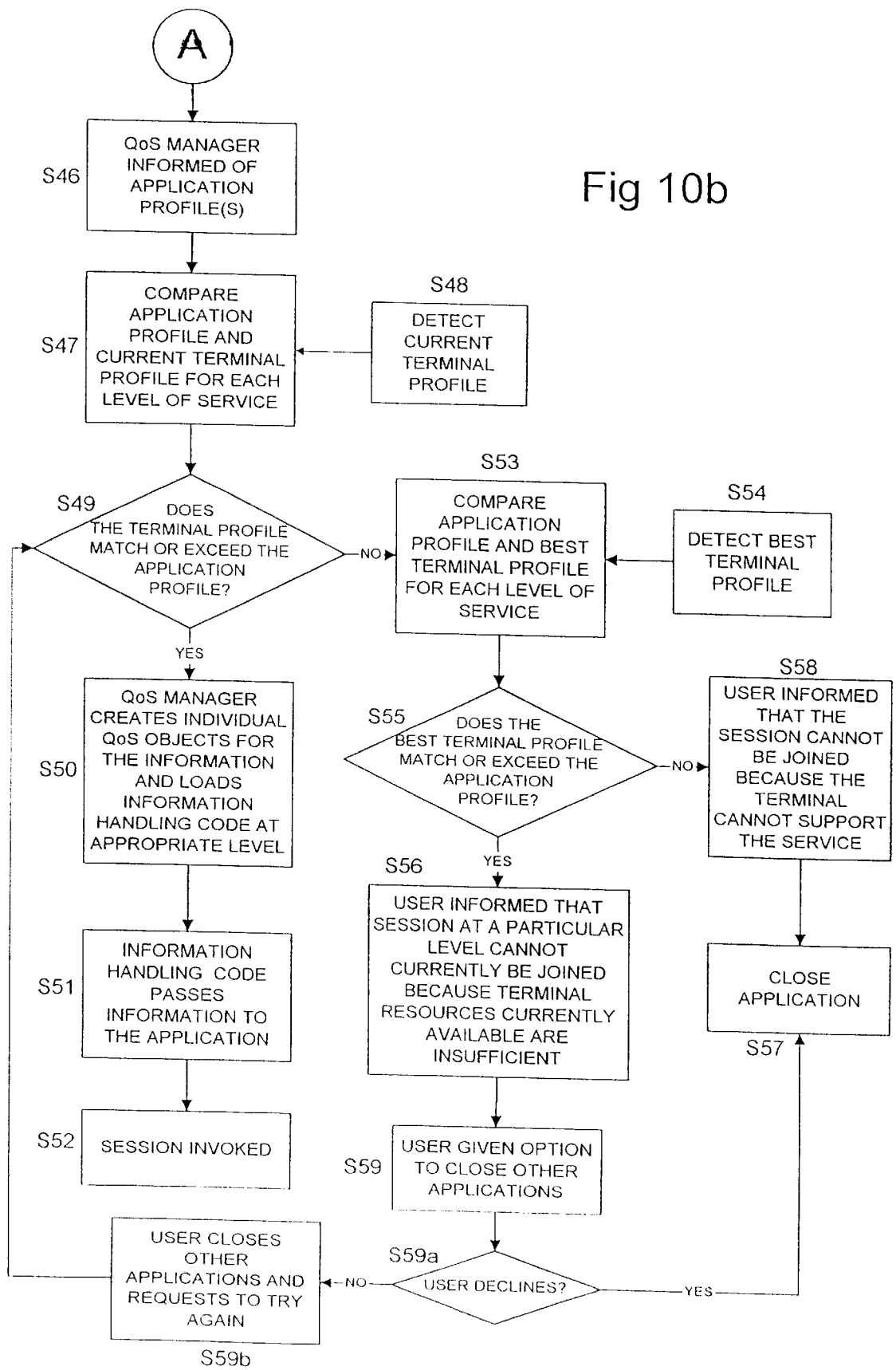

Thus as can be seen this method differs from the method of FIGS. 10a and 10b in that instead of determining the application profile or profiles remotely, the application profile or profiles are determined at the terminal. The former method requires the transmission of both the session description information and the application profiles whilst the latter method requires only the transmission of the session description information in the session announcement.

In step S65 the QoS manager is informed of the application profile or profiles and in step S66 the application profile for each level of service is compared with the current terminal profile which has been detected in step S67. In step S68 it is then determined whether the terminal profile matches or exceeds the application profile and if so, in step S69 the QoS manager creates individual QoS objects for the information and loads the information handling code at the appropriate level. In step S70 the application identified in the session description is then launched and in step S71 the information handling code passes information to the application whereby in step S72 the session is invoked.

If in step S68 it is determined that the terminal profile does not match or exceed the application profile, in step S73 the application profile for each level of service is compared with the best terminal profile which is determined in step S74. In step S75 it is determined whether the best terminal profile matches or exceeds the application profile and if so the user is informed that the session at a particular level cannot currently be joined because the terminal resources currently available are insufficient in step S76 and the process-terminates.

If in step S75 it is determined that the terminal profile does not match or exceed the application profile, the user is informed in step S78 that the session cannot be joined because the terminal cannot support the service.

The method of FIGS. 11a and 11b differs from the method of FIGS. 10a and 10b in that the application is not initially launched and closed if the session cannot be joined. In the implementation of FIGS. 11a and 11b the application is only launched if there are sufficient resources for the session.

Figure 12:
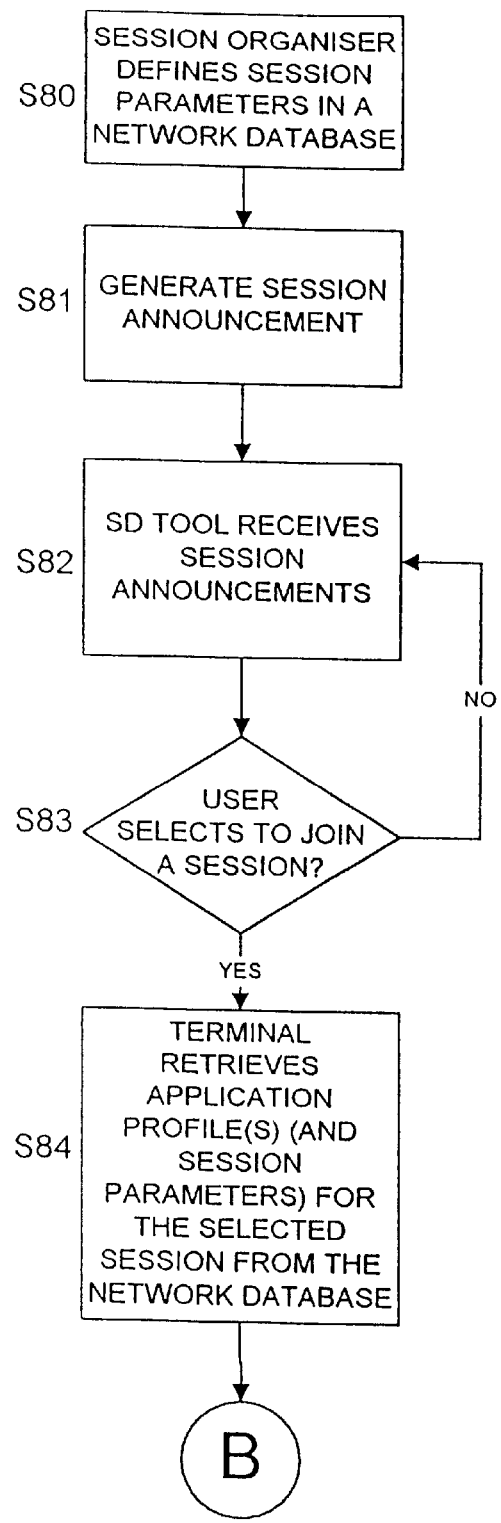
FIG. 12 is a flow diagram of alternative steps to those of FIG. 11a in the implementation of a third method of operation of the embodiment of FIG. 8.

FIG. 12 illustrates an alternative method which can replace steps S60 to S64 i.e. FIG. 11a. In this alternative method in step S80 a session organiser defines session parameters in a network database. In step S81 the session announcement is generated and this comprises merely an announcement on one multicast address which gives the time or times of the session or sessions, a session name and description, and the multicast addresses on which the media types are available.

In step S82 the SD tool receives the session announcements and in step S83 the process awaits the selection of a session by a user. In step S84 once a user has selected to join a session the terminal retrieves the application profile, and if necessary the session parameters for the selected session from the network database.

This method reduces the bandwidth required for the session announcement since it contains minimal information. Although in this method both the application profiles and the session parameters are retrieved, only the application profiles may be retrieved. Alternatively only the session parameters may be retrieved and the application profiles formed therefrom using a database of application profiles and session parameters stored in the terminal.

Although in the embodiments described hereinabove if a user could not join a session as selected and with the media types and formats selected, he is informed accordingly, alternatively, the user could be informed of the media types and/or formats at which the service could be provided. For example, although the user requested to join a multimedia session with the video media type having a format of MPEG2, the terminal profile may indicate that there are insufficient resources to support this level of service and thus it can be indicated to a user that it is possible to join the multicast session at a lower level i.e. MPEG.

Figure 13A:
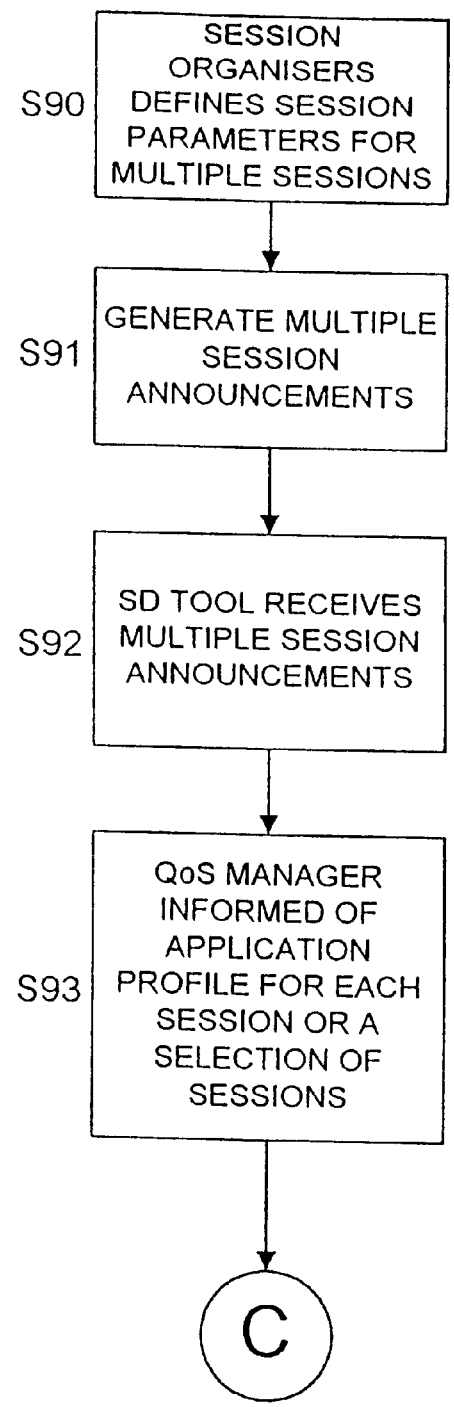
FIGS. 13a and 13b are flow diagrams illustrating a fourth method of operation of the embodiment of FIG. 8.
Figure 13B:
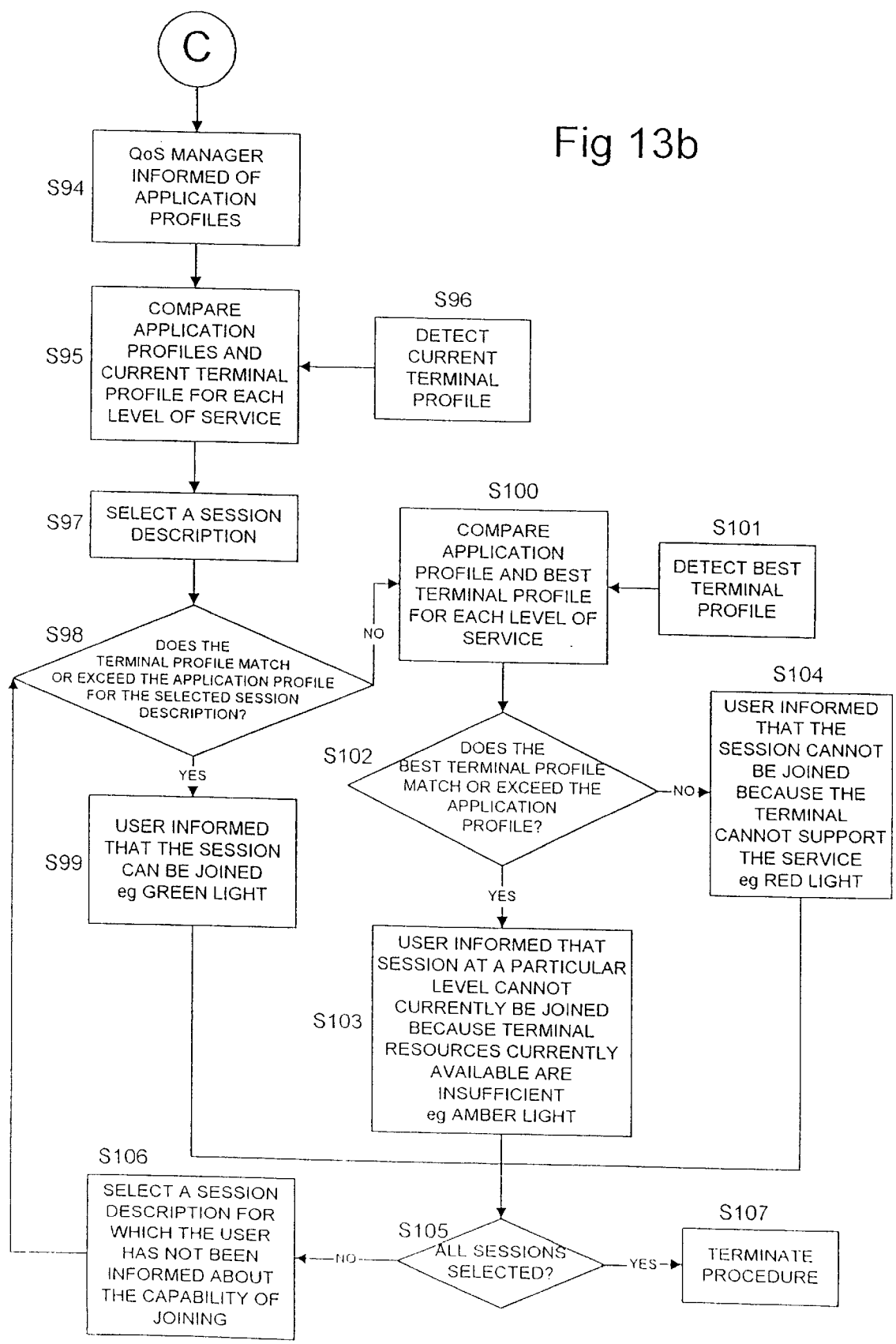

Since multicast applications are made available by way of announcement, since there may be many multicast sessions which a participant could join and thus it would be useful for a participant to know immediately which sessions could be joined. The method of FIGS. 13a and 13b provide such a function.

In step S90 the session organiser defines session parameters for multiple sessions and in step S91 multiple session announcements are made. In step S92 the SD tool receives the multiple session announcements and in step S93 the QoS manager is informed of the application profiles for each session or a selection of sessions. In step S94 the QoS manager is then informed of the application profiles and in step S95 the application profiles for each level of service are compared with the current terminal profile which is provided in step S96.

In step S97 the process then selects a session description and in step S98 it is determined whether the terminal profile matches or exceeds the application profile for the selected session description, and if so in step S99 the user is informed that the session can be joined. The user can be informed by for example the placement of a green light next to the session description on a display of the terminal.

If in step S98 it is determined that the terminal profile does not match or exceed the application profile for the selected session description, in step S100 the application profile for each level of service is compared with the best terminal profile which is determined in step S101. In step S102 it is then determined whether the best terminal profile matches or exceeds the application profile and if so the user is informed that the session cannot currently be joined because the terminal resources currently available are insufficient. This may be indicated to a user for example by an amber light next to the session description on a display of the terminal.

If in step S102 it is determined that the best terminal profile does not match or exceed the application profile, in step S104 the user is informed that the session cannot be joined because the terminal cannot support the service. This can be indicated for example by a red light next to the session description on a display of the terminal.

In step S105 it is then determined whether all the sessions have been selected and if not in step S106 a session description for which the user has not been informed about the capability of joining is selected and the process returns to step S98. If in step S105 it is determined that the user has been informed about the capability of joining all of the sessions, the process terminates at step S107.

This process enables a user to determine immediately whether he is capable of joining a multicast session. Any sessions which have amber lights displayed next to them will require a user to close down other applications which are currently running on the terminal in order to free resources. Once the resources have been freed, the process of FIGS. 13a and 13b can be repeated to determine which sessions can be joined.

So far we have only considered the initiation of a multicast session wherein a user selects a session to join and the session is initiated using the media types and formats given in the session description. If the session is capable of supporting multiple levels, the multicast level implemented by the terminal will depend upon the resources available and may be selectable by a user. For example, although the terminal may support video in MPEG2 format, the user may be quite happy to receive video in MPEG format. Also, although the multimedia session may comprise both audio and video, the user may select only to receive video.

Once a multicast session has been joined, because the terminal may be operating other applications which consume resources, this embodiment of the present invention monitors the performance of the service and adapts accordingly. As seen in FIG. 9, each media type has its own monitor 44a, 44b and 44c and its own controller 43a, 43b and 43c. Thus, the QoS manager 44d is given information on the quality of service currently provided and is further given information on the resources currently available from the terminal resource monitor 45. In this embodiment each of the media types are adapted separately. If a session has multiple levels comprising different formats for media types or the possibility of selecting the media types for the session, when the resources available at the terminal are determined to be insufficient, the level of service can be adapted accordingly. Further, a user may select different media types to have different priorities or in the session description media types may be given different priorities. For example, if resources are limited, video may be given preference over audio.

Figure 14:
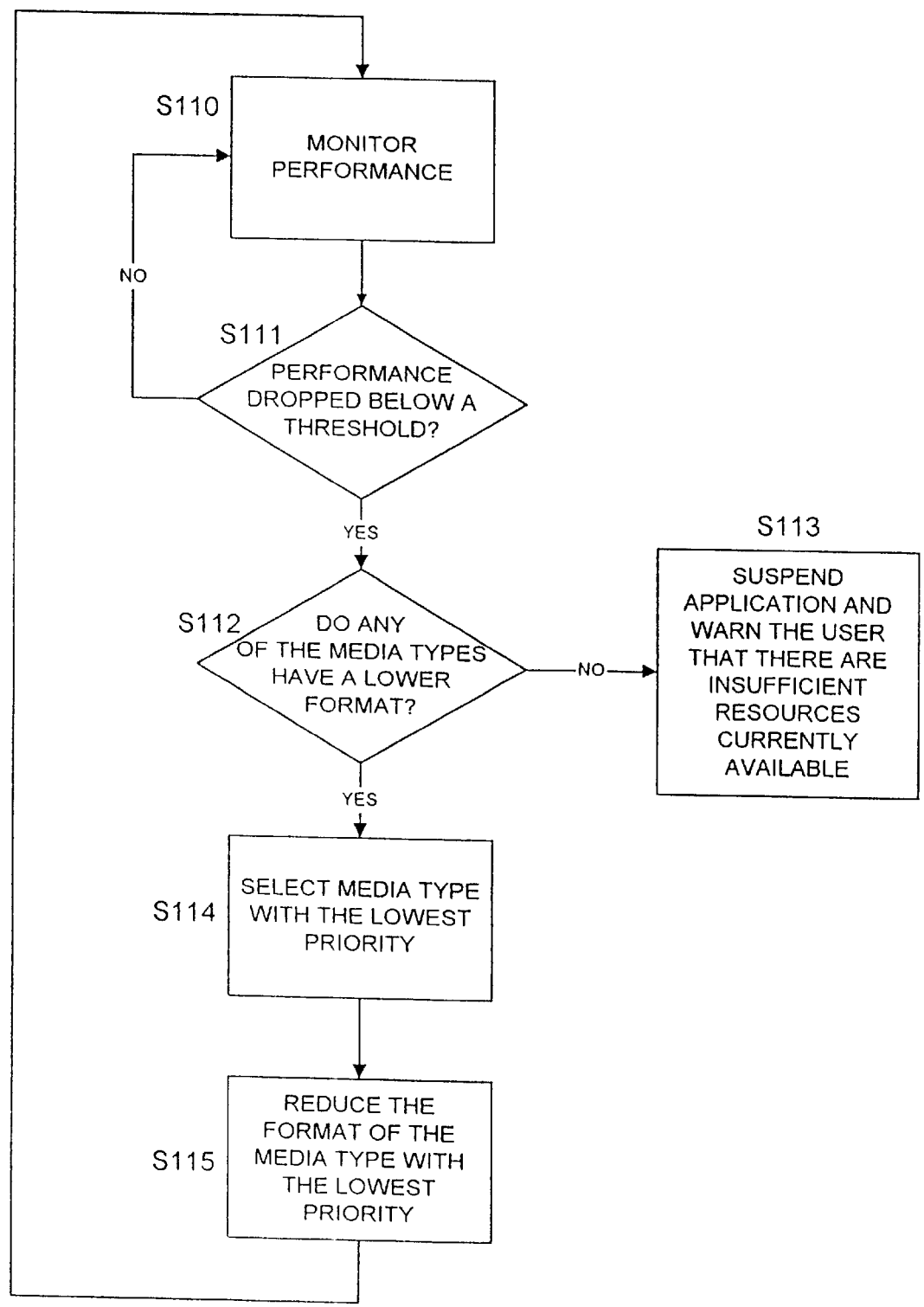
FIG. 14 is a flow diagram illustrating the adaption process when the performance drops.

FIG. 14 is a flow diagram illustrating the particular steps for producing the further service when the terminal resources are insufficient. In step S110 the performance of the media type is monitored, for example, information is retrieved from the code handling data such as information on packet losses and for the processing of graphics, the rendering performance can be monitored. In this way the deficiency in communication capability and the deficiency of processing power or memory can be detected. If in step S111 it is detected that the performance drops below a threshold, in step S112 it is determined whether any of the media types have a lower format. If none have a lower media type in step S113 the application is suspended and the user is warned that there are insufficient resources currently available. If there are media types of lower format, in step S114 the media type which has the lowest priority is selected and in step S115 the format of the media type with the lowest priority is reduced. The process then returns to step S110 to monitor the effect of the change on the performance.

Thus in accordance with this method the service provided at the terminal can be adapted to suit the resources available.

Figure 15:
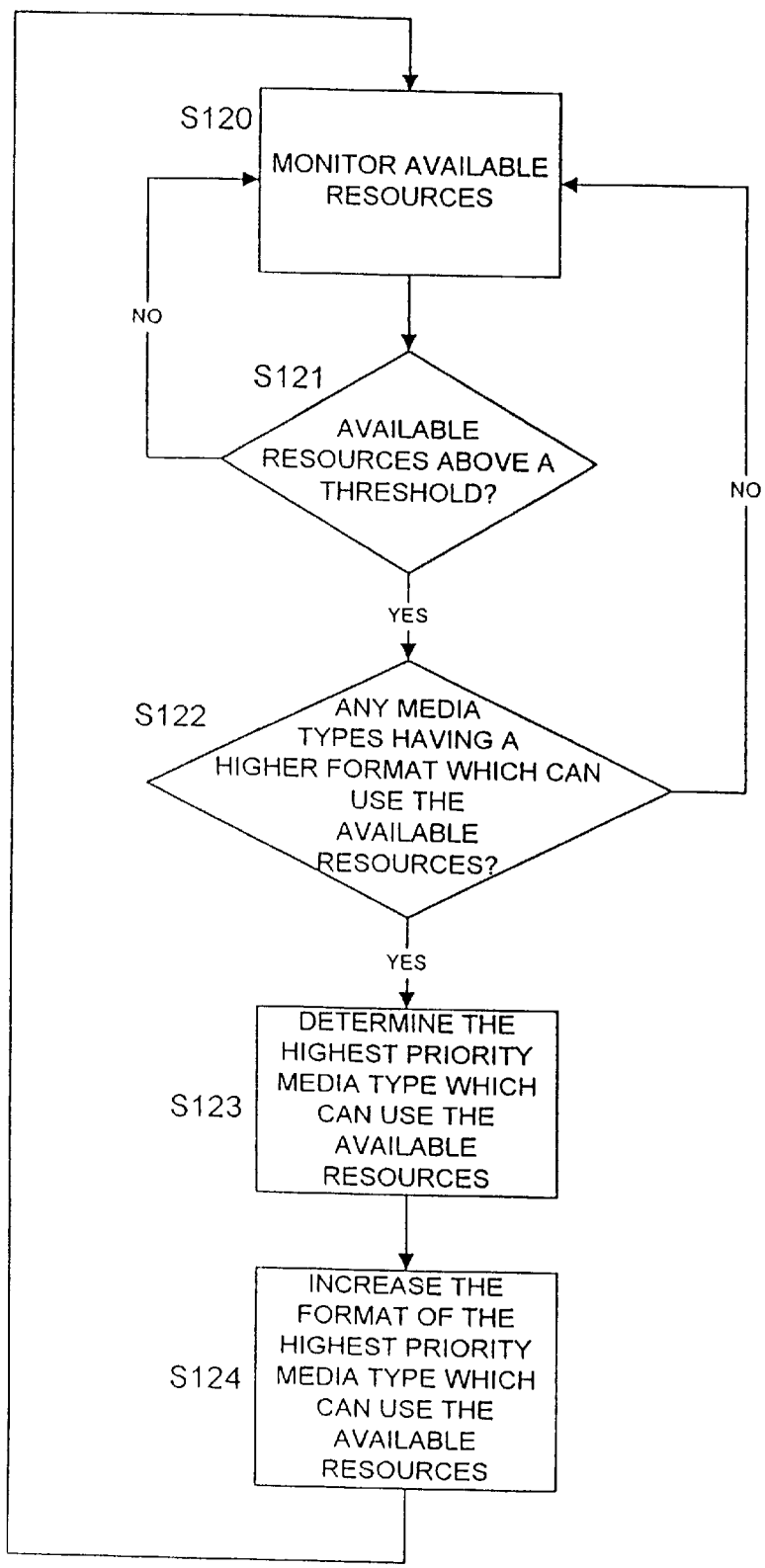
FIG. 15 is a flow diagram illustrating the adaption process when more resources become available.

FIG. 15 illustrates the steps taken in order to increase the level of service. In step S120 the terminal resources available are monitored. In step S121 if it is determined that the available resources are above a threshold the process proceeds to step S122 where it is determined whether there are any media types having a higher format which can use the available resources. If not the process returns to step S120. If there are media types which have a higher format which can use the available resources, in step S123 the media type which can use the available resource which has the highest priority is determined and in step S124 the format of the highest priority media type is increased thus using at least some of the available resources. The process then returns to step S120 to monitor the effect of the change.

The QoS manager 44d in FIG. 9 thus has the job of arbitrating to determine which media type is to lose out when resources become scarce and which media type is to gain when resources become available. The form of arbitration which can take place can be rule-based or can be operated by any suitable algorithm operated, for example, using fuzzy logic, or a neural network. The information which is processed in order to make a decision regarding the changing of the level of service is:

(1) any failures of the media types;
(2) application profiles;
(3) terminal profile i.e. current resources available;
(4) priorities given to media types.

Although this embodiment describes the session as being announced, an alternative implementation can use invitations whereby participants are contacted specifically to invite them to join a session.

As can be seen in the embodiments described hereinabove, the present invention is applicable to many different applications. In a video conferencing embodiment, participants are invited to participate and the service is configured in accordance with the participants who accept the invitation. In such an application the configuration engine for the video conference knows the number and identity of the participants. In the multicast application the service is offered by way of announcement and participants can join the session in response to the announcement. Thus, in this embodiment the configuration of the service occurs individually.

The monitoring of the resources to the terminal in order to provide the terminal profile can be achieved using any known technique. In the first embodiment the technique of interrogating the registry in the Windows operating system has been described. However, in another technique an application could be used to directly monitor the resources available at the terminal.

Though specific methods of enabling the comparison of the terminal profile and the application profile are described, the present invention is not limited to the specific methods described. The present invention covers any method including the transmission of the application profile to allow the comparison to take place at the terminal, the transmission of the terminal profile to the information provider to allow the comparison to take place at the information provider, and the transmission of intermediary information which allows the terminal profile or the application profile to be deduced therefrom.

As is clear from the foregoing embodiments, the present invention provides for an improved information transfer control arrangement since the resources required at the terminal to process the information is determined and compared with the currently available resources which is determined by monitoring the current status of the terminal. By directly comparing the resources required the transfer of information can be more accurately controlled.

Although the present invention has been described hereinabove with reference to specific embodiments, it will be apparent to a skilled person in the art that modifications are possible within the scope of the invention as defined by the appended claims.

What is claimed is:

1. Control apparatus for controlling the transfer of information to a remote apparatus, the control apparatus comprising:
   determining means for determining resources required at the remote apparatus to process the information;
   monitoring means for monitoring the resources currently available at the remote apparatus which is to receive the information;
   comparing means for comparing the resources required and the resources currently available at the remote apparatus; and
   control means for controlling the transfer of information to the remote apparatus in accordance with the result of the comparison.

2. Control apparatus according to claim 1 wherein said control means is adapted to prevent the transference of information to the remote apparatus if it has insufficient resources currently available to process the information.

3. Control apparatus according to claim 1 wherein said control means is adapted to control the format of the information to be transferred to the remote apparatus.

4. Control apparatus according to claim 1 including user operable control means for setting preferred requirements for the remote apparatus; said comparing means being operable to compare the resources required with both the resources currently available at the remote apparatus and the preferred requirements for the remote apparatus.

5. Control apparatus according to claim 1 including second determining means for determining resources available for communication links to said remote apparatus, wherein the first determining means is adapted to also determine the resources required for transmission of the information over the communication links, and said comparing means is adapted to also compare the resources required for transmission with the resources available for the communication links.

6. Control apparatus according to claim 1 wherein said control means is adapted to allow the transfer of information to the remote apparatus if the resources are capable of allowing the processing of the information.

7. Control apparatus according to claim 1 wherein said resources required define requirements for the information to be processed in a plurality of formats by the remote apparatus, and said control means is adapted to allow the transfer of information in a format compatible with the resources of the remote apparatus.

8. Control apparatus according to claim 1 wherein said information to be transferred comprises a plurality of types of information, and said control means is adapted to separately control the transfer of each type of information.

9. Control apparatus according to claim 8 including configuration means for configuring said remote apparatus to both transmit and receive at least one type of said information in dependence upon the result of the comparison.

10. Control apparatus according to claim 7 including means for determining the maximum resources of the remote apparatus, wherein, said comparing means is adapted to compare the resources required and the determined maximum resources, and said control means is adapted to control the transfer of the information in accordance with the result of the comparison.

11. Control apparatus according to claim 10 including means for indicating if the resources required exceed the resources currently available but are met by the determined maximum resources.

12. Control apparatus according to claim 7 wherein said control means is adapted to adaptively control the format of the information transferred in dependence upon the result of the comparison.

13. Control apparatus according to claim 12 including means for detecting errors during the transference and/or processing of the information, wherein if a format of the information is available which requires less resources, said control means is adapted to change the format of the information transferred to the format requiring less resources in response to the means for detecting-errors.

14. Control apparatus according to claim 1 wherein said control means is adapted to adaptively control the format of the information transferred in dependence upon the result of the comparison.

15. Control apparatus according to claim 14 wherein said control means is adapted to change the format of the information transferred to a format which requires more resources which can be met by the resources detected as being currently available.

16. Control apparatus according to claim 8 wherein said information types have priorities associated therewith, and said control means is adapted to control the transfer of each type of information taking the priorities into account.

17. A method of controlling the transfer of information to a remote apparatus, the method comprising:
   a determining step of determining resources required at the remote apparatus to process the information;
   a monitoring step of monitoring the resources currently available at the remote apparatus which is to receive the information;
   a comparing step of comparing the resources required and the resources currently available at the remote apparatus; and
   a control step of controlling the transfer of information to the remote apparatus in accordance with the result of the comparison step.

18. A method according to claim 17 wherein said control step comprises preventing the transference of information to the remote apparatus if it has insufficient resources currently available to process the information.

19. A method according to claim 17 wherein said control step comprises controlling the format of the information to be transferred to the remote apparatus.

20. A method according to claim 17 including the step of setting user preferred requirements for the remote apparatus; wherein said comparing step includes the step of also comparing the resources required with the user preferred requirements for the remote apparatus.

21. A method according to claim 17 including a second determining step of determining resources available for communication links to said remote apparatus, wherein said first determining step includes determining the resources required for transmission of the information over the communication links and said comparing step includes the step of also comparing the resources required for transmission with the resources available for the communication links.

22. A method according to claim 17 wherein said control step allows the transfer of information to the remote apparatus if the resources are capable of allowing the processing of the information.

23. A method according to claim 17 wherein said resources required define requirements for the information to be processed in a plurality of formats by the remote apparatus, and said control step allows the transfer of information in a format compatible with the resources of the remote apparatus.

24. A method according to claim 17 wherein said information to be transferred comprises a plurality of types of information, and said control step comprises separately controlling the transfer of each type of information.

25. A method according to claim 24 including a configuration step of configuring said remote apparatus to both transmit and receive at least one type of information in dependence upon the result of the comparison step.

26. A method according to claim 23 including the steps of determining the maximum resources of the remote apparatus, comparing the resources required and the determined maximum resources, and controlling the transfer of the information using the result of the comparison.

27. A method according to claim 26 including the step of indicating if the resources required exceed the resources currently available but are met by the determined maximum resources.

28. A method according to claim 23 wherein the format of the information transferred is controlled in dependence upon the result of the comparison step.

29. A method according to claim 28 including the steps of detecting errors during the transference and/or processing of the information, and, if a format of the information is available which requires less resources, changing the format of the information transferred to the format requiring less resources in response to the detected errors.

30. A method according to claim 17 wherein the format of the information transferred is adaptively controlled in dependence upon the result of the comparison.

31. A method according to claim 30 wherein the format of the information transferred is changed to a format which requires more resources which can be met by the resources detected as being currently available.

32. A method according to claim 24 wherein said information types have priorities associated therewith, and the transfer of each type of information is controlled taking the priorities into account.

33. Control apparatus for controlling the distributed processing of data by a plurality of remote apparatuses, the control apparatus comprising:

determining means for determining resources required at the or each remote apparatus to process the data in a distributed manner;

monitoring means for monitoring resources currently available at the or each remote apparatus;

comparing means for comparing the resources required and the resources currently available at the or each remote apparatus; and control means for controlling the processing of data by the or each remote apparatus in accordance with the result of the comparison.

34. Control apparatus according to claim 33 wherein said data comprises a plurality of data types, and said control means is adapted to control the processing of the data types such that each remote apparatus only receives and processes data of the type which it is capable of processing as indicated by the respective resources of the respective remote apparatus.

35. A method of controlling the distributed processing of data by a plurality of remote apparatuses, the method comprising:

a determining step of determining resources required at the or each remote apparatus to process the data in a distributed manner;

a monitoring step of monitoring resources currently available at the or each remote apparatus;

a comparing step of comparing the resources required and the resources currently available at the or each remote apparatus; and a control step of controlling the processing of data by the or each remote apparatus in accordance with the result of the comparison step.

36. A method according to claim 35 wherein said data comprises a plurality of data types, and said control step comprises controlling the processing of data such that each remote apparatus only receives and processes data of the type which it is capable of processing as indicated by the respective resources of the respective remote apparatus.

37. A method of providing a service over a plurality of terminals connected over a network, the method comprising:

a determining step of determining resources required at each terminal to provide the service;

a monitoring step of monitoring resources currently available at each terminal;

a comparison step of comparing the resources required and the resources currently available at each terminal; and a control step of controlling the service provided at each terminal in response to the result of the comparison step.

38. A method according to claim 37 wherein said service requires the use of a plurality of data types by said terminals, said resources required by said service comprise a set of requirements for each data type, said comparison step comprises comparing each set of requirements and the resources of each terminal, and said control step comprises setting the type of service provided at each terminal in dependence upon the results. of the comparisons.

39. A method according to claim 38 wherein each data type may have more than one data format, each set of requirements includes requirements of the or each data format, and said control step includes the step of setting the format of the service provided at each terminal in dependence upon the results of the comparisons.

40. A method according to claim 37 including the step of setting user preferred requirements for each terminal, wherein said comparing step also includes the step of comparing the requirements of the service with the user preferred requirements, and the service provided at each respective terminal is controlled in response to the result of the comparison step.

41. A method according to claim 37 including a second determining step of determining resources of the network, wherein said comparing step includes the step of also comparing the requirements of the service with the resources of the network, and the. service provided at each terminal is controlled in response to the result of the comparison step.

42. A method according to claim 37 wherein said control step includes the step of configuring each terminal in response to said comparison step.

43. Apparatus for providing a service over a plurality of terminals connected over a network, said apparatus comprising determining means for determining resources required at each terminal to provide the service;

monitoring means for monitoring resources currently available at each terminal;

comparison means for comparing the resources required and the resources currently available at each terminal; and control means for controlling the service provided at each terminal in response to the result of the comparison.

44. Apparatus according to claim 43 wherein said service requires the use of a plurality of data types by said terminals, said requirements of said service comprise a set of requirements for each data type, said comparison means is adapted to compare each set of requirements with the resources of each terminal, and said control means is adapted to set the type of service provided at each terminal in dependence upon the results of the comparisons.

45. Apparatus according to claim 44 wherein each data type may have more than one data format, each set of requirements includes requirements of the or each data format, and said control means is adapted to set the format of the service provided at each terminal in dependence upon the results of the comparison.

46. Apparatus according to claim 43 including user operable means for setting preferred requirements for each terminal, wherein said comparing means is adapted to also compare the requirements of the service with the preferred requirements, and said control means is adapted to control the provision of the service at each respective terminal in response to the result of the comparison.

47. Apparatus according to claim 43 including second determining means for determining resources available in the network wherein said comparing means is adapted to also compare the requirements of the service with the resources of the network, and said control means is adapted to control the provision of the service at each terminal in dependence upon the result of the comparison.

48. Apparatus according to claim 43 wherein said control means includes configuration means for configuring each terminal in response to the comparison.

* * * * *

UNITED STATES PATENT AND TRADEMARK OFFICE
CERTIFICATE OF CORRECTION

PATENT NO.   : 6,088,732
DATED        : July 11, 2000
INVENTOR(S)  : Smith et al.

It is certified that error appears in the above-identified patent and that said Letters Patent is hereby corrected as shown below:

<u>Title page,</u>
Item [30], Foreign Application Priority Data, change "Apr. 14, 1997" to -- Mar. 14, 1997 --.

Signed and Sealed this

Twenty-fifth Day of November, 2003

JAMES E. ROGAN
*Director of the United States Patent and Trademark Office*